(12) United States Patent
Bar-El et al.

(10) Patent No.: US 10,009,173 B2
(45) Date of Patent: *Jun. 26, 2018

(54) SYSTEM, DEVICE, AND METHOD OF SECURE ENTRY AND HANDLING OF PASSWORDS

(71) Applicant: ARM Technologies Israel Ltd., Kfar Netter (IL)

(72) Inventors: Hagai Bar-El, Rehovot (IL); Yaacov Sella, Haifa (IL); Alon Ziv, Netanya (IL); Roni Sasson, Tel Aviv (IL)

(73) Assignee: ARM LIMITED, Cambridge (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/130,118

(22) Filed: Apr. 15, 2016

(65) Prior Publication Data

US 2016/0234014 A1   Aug. 11, 2016

Related U.S. Application Data

(63) Continuation of application No. 13/740,292, filed on Jan. 14, 2013, now Pat. No. 9,344,275.

(Continued)

(51) Int. Cl.
*H04L 29/06* (2006.01)
*H04L 9/08* (2006.01)
(Continued)

(52) U.S. Cl.
CPC ............... *H04L 9/08* (2013.01); *G06F 21/10* (2013.01); *G06F 21/6281* (2013.01); *G06F 21/83* (2013.01); *G06F 21/84* (2013.01); *G09C 5/00* (2013.01); *H04L 9/0894* (2013.01); *H04L 9/3226* (2013.01); *H04L 9/3247* (2013.01);
(Continued)

(58) Field of Classification Search
CPC ....... H04L 63/083; H04L 9/08; H04L 9/3247; H04L 63/166; H04L 9/3263; H04L 63/168; H04L 9/3271; H04L 9/3226; H04L 63/08; H04L 9/0894; H04L 63/0823;
(Continued)

(56) References Cited

U.S. PATENT DOCUMENTS

| 6,714,982 | B1 * | 3/2004 | McDonough | G06Q 20/382 705/64 |
| 8,464,062 | B2 * | 6/2013 | Brown | H04L 9/0844 380/223 |

(Continued)

*Primary Examiner* — Mahfuzur Rahman
*Assistant Examiner* — Narciso Victoria
(74) *Attorney, Agent, or Firm* — Eitan, Mehulal & Sadot

(57) ABSTRACT

Devices, system, and methods of secure entry and handling of passwords and Personal Identification Numbers (PINs), as well as for secure local storage, secure user authentication, and secure payment via mobile devices and via payment terminals. A computing device includes: a secure storage unit to securely store a confidential data item; a non-secure execution environment to execute program code, the program code to transport to a remote server a message; a secure execution environment (SEE) to securely execute code, the SEE including: a rewriter module to securely obtain the confidential data item from the secure storage, and to securely write the confidential data item into one or more fields in said message prior to its encrypted transport to the remote server.

17 Claims, 6 Drawing Sheets

Related U.S. Application Data

(60) Provisional application No. 61/643,977, filed on May 8, 2012, provisional application No. 61/730,996, filed on Nov. 29, 2012.

(51) Int. Cl.

| | | |
|---|---|---|
| *G09C 5/00* | (2006.01) | |
| *H04L 9/32* | (2006.01) | |
| *H04W 12/06* | (2009.01) | |
| *G06F 21/10* | (2013.01) | |
| *G06F 21/62* | (2013.01) | |
| *G06F 21/83* | (2013.01) | |
| *G06F 21/84* | (2013.01) | |

(52) U.S. Cl.
CPC .......... *H04L 9/3263* (2013.01); *H04L 9/3271* (2013.01); *H04L 63/08* (2013.01); *H04L 63/083* (2013.01); *H04L 63/0823* (2013.01); *H04L 63/166* (2013.01); *H04L 63/168* (2013.01); *H04W 12/06* (2013.01); *H04L 2209/603* (2013.01); *H04L 2209/80* (2013.01)

(58) Field of Classification Search
CPC ...... G06F 21/84; G06F 21/83; G06F 21/6281; G06F 21/10; G09C 5/00; H04W 12/06
See application file for complete search history.

(56) References Cited

U.S. PATENT DOCUMENTS

2006/0294370 A1* 12/2006 Greenspan .............. G06F 21/53
  713/164
2012/0150749 A1*  6/2012 Coppinger ............. G06Q 20/02
  705/71

\* cited by examiner

SYSTEM, DEVICE, AND METHOD OF SECURE ENTRY AND HANDLING OF PASSWORDS

CROSS-REFERENCE TO RELATED APPLICATIONS

This patent application is a Continuation of U.S. patent application Ser. No. 13/740,292, filed on Jan. 14, 2013, which is hereby incorporated by reference in its entirety.

The above-mentioned U.S. patent application Ser. No. 13/740,292 claimed priority and benefit from (i) U.S. provisional patent application No. 61/643,977, filed on May 8, 2012, which is hereby incorporated by reference in its entirety; and (ii) U.S. provisional patent application No. 61/730,996, filed on Nov. 29, 2012, which is hereby incorporated by reference in its entirety.

FIELD

The present invention relates to the field of telecommunications security.

BACKGROUND

Millions of people utilize smartphones, tablets, and other mobile computing devices to perform various tasks. Some tasks may not pose major security risks, for example, taking photographs with a camera of the mobile device. However, some tasks may pose security risks, for example, utilizing the mobile device in order to access an online banking website, to perform electronic commerce (E-commerce) transactions of mobile payments (M-payments) transactions.

Some of the threats posed to a user of a mobile device may include, for example, a "phishing" scam in which an attacker presents to the user a mock web-page impersonating a legitimate banking site. The user may be induced into entering his username and password on the mock web-page, thereby allowing the attacker to capture the username and password which may be then used by the attacker to impersonate the real user and log-in to the real banking site.

Furthermore, mobile devices utilized in a corporate environment, and particularly in accordance with a "bring you own device" (BYOD) organizational policy, may expose both the user and the entire organization to risks of data loss or monetary loss. For example, an attacker may capture the username and password of a user and may utilize them to log-in to a corporate network or resource.

Some websites and some corporate organizations may require a password to have a minimum length (e.g., at least 8 characters) and/or a required entropy (e.g., having at least one letter and at least one digit). However, many users are incapable of memorizing a cumbersome password, and end-up choosing a weak password which may be easily cracked by a brute-force attack, or otherwise guessed. This is particularly true for users of mobile devices, in which the physical keyboard or the virtual (on-screen) keyboard are of a small form factor, which renders password entry tedious and effort-consuming. Furthermore, even a "strong" password may be captured from many users by an attacker which operates a "phishing" scam, or utilizes a software-based keylogger malware application.

Public-Key Infrastructure (PKI) attempts to mitigate security problems by utilizing digital certificates issued by a Certificate Authority (CA). However, cryptography-based authentication via PKI requires a cumbersome user enrollment process, often lacks a key repository at the client side, and often lacks a unified user experience.

Furthermore, securing the authentication process between the user of a mobile device and a service may not suffice to fully protect the user. For example, the service may provide confidential data which may be cached or stored in the mobile device, or may be captured by other applications (e.g., legitimate applications or malware modules) which may be running on the mobile device and which may optionally transmit the captured data over a communication network to a remote location. This problem may be partially mitigated by encryption of locally-stored or locally-cached data. However, the encryption often utilizes a weak user-selected password, which may be cracked by a brute-force attack, a dictionary attack, a keylogging module. Other encryption methods may be circumvented by a module which searches the mobile device for a locally-stored copy of the encryption key.

SUMMARY

The present invention may include, for example, devices, system, and methods of secure entry and handling of passwords and Personal Identification Numbers (PINs), as well as for secure local storage, secure user authentication, and secure payment via mobile devices and via payment terminals.

In accordance with the present invention, for example, a mobile electronic device may comprise: a secure execution environment (SEE) to securely execute code; a secure video path (SVP) to securely exchange information between the SEE and a touch-screen of the mobile electronic device; wherein the SEE comprises a secure password entry module to generate a scrambled on-screen interface, and to send the scrambled on-screen interface to the touch-screen through the SVP.

In accordance with the present invention, for example, the secure password entry module may comprise: a touch-event recognizer to securely identify within the SEE a character which corresponds to a virtual key that a user selected via the touch-screen on the scrambled on-screen interface.

In accordance with the present invention, for example, the mobile electronic device may comprise: a secure content channel to transport the scrambled on-screen interface, securely against interception, from the SEE to the touch-screen.

In accordance with the present invention, for example, the mobile electronic device may comprise: a secure content channel to transport the scrambled on-screen interface, from the SEE to the touch-screen, as an encoded Digital Rights Management (DRM) protected video.

In accordance with the present invention, for example, the mobile electronic device may comprise: a DRM-enabled playback module to playback the encoded DRM-protected video representing the scrambled on-screen interface.

In accordance with the present invention, for example, the scrambled on-screen interface may comprise at least one of: an on-screen scrambled virtual keyboard; an on-screen scrambled virtual keypad; an on-screen representation of wheels of digits, wherein each wheel is rotatable in response to a user gesture on the touch-screen.

In accordance with the present invention, for example, the scrambled on-screen interface may comprise a user-specific authenticity reassurance image.

In accordance with the present invention, for example, the user-specific authenticity reassurance image may comprise a user-uploaded image captured by the user through a camera of the mobile electronic device.

In accordance with the present invention, for example, the SEE may comprise code to securely modify, based on a user command, one or more visible properties of said image prior to an upload of said image.

In accordance with the present invention, for example, the SEE may comprise code to securely modify, based on a user command, one or more visible properties of the user-specific authenticity reassurance image subsequent to selection of the user-specific authenticity reassurance image from a collection of images.

In accordance with the present invention, for example, the user-specific authenticity reassurance image may comprise at least one of: an image overlaid as a watermark on top of the scrambled on-screen interface; an image overlaid as a watermark under the scrambled on-screen interface; an image displayed in proximity to the scrambled on-screen interface.

In accordance with the present invention, for example, the SVP may comprise a uni-directional SVP to send information securely only in a direction from the SEE to the touch-screen of the mobile electronic device.

In accordance with the present invention, for example, the mobile electronic device may comprise a device selected from the group consisting of: a laptop computer, a tablet, a smartphone, a portable computing device, a portable gaming device, a portable multimedia player, and a portable payment terminal.

In accordance with the present invention, for example, the mobile electronic device may comprise: a secure storage unit to securely store a cryptographic key, wherein the cryptographic key is unique to a particular task to be performed by said mobile electronic device; and a cryptographic operations module to release the cryptographic key from the secure storage unit based on a user gesture, received through said touch screen and indicating confirmation, and to utilize the cryptographic key for performing a cryptographic operation associated with said particular task.

In accordance with the present invention, for example, the cryptographic key may be also unique to a user of said mobile electronic device.

In accordance with the present invention, for example, the cryptographic operation may comprise at least one of: encryption using the cryptographic key; decryption using the cryptographic key.

In accordance with the present invention, for example, the cryptographic operation may comprise a cryptographic operation transparent to said particular task on said mobile electronic device.

In accordance with the present invention, for example, said particular task, for which said cryptographic key is unique, may comprise a task of unlocking access to an entirety of a storage unit of said mobile electronic device.

In accordance with the present invention, for example, the mobile electronic device may comprise: a payment card reader to read a payment card swiped therethrough; and a visual indicator to indicate to a user that the secure password entry module is activated and that the user can swipe the payment card through the payment card reader.

In accordance with the present invention, for example, the payment card reader is operational when the secure password entry module is activated; and the payment card reader is non-operational when the secure password entry module is non-activated.

In accordance with the present invention, for example, the mobile electronic device may comprise: a secure operations module to securely receive, from the secure password entry module, a password entered by a user via said touch-screen; to encrypt the password; and to send the encrypted password for verification at a verification module external to the mobile electronic device; wherein the verification module external to the mobile electronic device is to send a verification response indicating whether or not the password is verified; wherein the verification module may comprise at least one of: a remote server, and a smart-card external to the mobile electronic device.

In accordance with the present invention, for example, in response to a user entering a password via said scrambled on-screen interface on said touch-screen, the mobile electronic device may send, to a remote server, a message indicating touch coordinates to enable the remote server to determine the password and to initiate a process of verifying the password; wherein the mobile electronic device is unaware of the password entered by said user.

In accordance with the present invention, for example, a server or a computer may comprise: a secure execution environment (SEE) system to securely execute code; wherein the SEE system may comprise a secure password entry module (a) to generate a scrambled on-screen interface, and (b) to send the scrambled on-screen interface, as an encoded Digital Rights Management (DRM) protected video to a remote mobile device.

In accordance with the present invention, for example, the encoded DRM-protected video, when played by a DRM-enabled playback module of the remote mobile device, causes a touch-screen of the remote mobile device to securely display said scrambled on-screen interface generated by the SEE system of said server.

In accordance with the present invention, for example, the scrambled on-screen interface may comprise at least one of: an on-screen scrambled virtual keyboard; an on-screen scrambled virtual keypad; an on-screen representation of wheels of digits, wherein each wheel is rotatable in response to a user gesture on a touch-screen.

In accordance with the present invention, for example, the scrambled on-screen interface may comprise a user-specific authenticity reassurance image.

In accordance with the present invention, for example, the server may comprise: a verification module to verify a user-entered password entered on said scrambled on-screen interface via a touch-screen of the remote mobile device; wherein the verification module is to receive from said remote mobile device a message indicating touch coordinates corresponding to touch gestures of a user on said touch-screen; wherein the verification module determines the user-entered password from said touch coordinates while the user-entered password remains unknown to the remote mobile device In accordance with the present invention, for example, a computing device may comprise: a secure storage unit to securely store a confidential data item; a non-secure execution environment to execute program code, the program code to transport to a remote server a message; a secure execution environment (SEE) to securely execute code, the SEE comprising: a rewriter module to securely obtain the confidential data item from the secure storage, and to securely write the confidential data item into one or more fields in said message prior to its encrypted transport to the remote server.

In accordance with the present invention, for example, the confidential data item may comprise at least one of: a password, a Personal Identification Number (PIN), a user-name, a string representing user credentials, a data item for authentication; wherein the SEE comprises code to securely perform an encryption operation on said message prior to its transport to the remote server.

In accordance with the present invention, for example, the program code may comprise an application to transport the message to the remote server via a transport security protocol.

In accordance with the present invention, for example, the message may be associated with a data object indicating a particular field in which the confidential data item is to be inserted by the rewriter module.

In accordance with the present invention, for example, the rewriter module may comprise: an inference module to infer a particular field of the message, in which the confidential data item is to be inserted by the rewriter module, based on contextual analysis.

In accordance with the present invention, for example, the rewriter module may comprise: a field determining module to determine a particular field of the message, in which the confidential data item is to be inserted by the rewriter module, based on a service certificate received from a remote server.

In accordance with the present invention, for example, the program code may comprise a web browser, and the message may comprise data transferred over HyperText Transfer Protocol Secure (HTTPS).

In accordance with the present invention, for example, the message may comprise at least a username field and a password field.

In accordance with the present invention, for example, the message may comprise one or more data items for authenticating a user to the remote server.

In accordance with the present invention, for example, the rewriter may be capable of operating independently of a particular type of authentication scheme utilized by the remote server, wherein operations of the rewriter keep the remote server unaware that rewriting is performed on said computing device.

In accordance with the present invention, for example, the computing device comprises a device selected from the group consisting of: a smartphone, and a tablet.

In accordance with the present invention, for example, a method implementable on a computing device may comprise: securely storing a confidential data item in a secure storage unit of said computing device; executing a program code in a non-secure execution environment of said computing device, wherein the program code comprises program code to transport a message to a remote server; securely executing code in a secure execution environment (SEE) of said computing device, wherein securely executing the code in the SEE may comprise: securely obtaining the confidential data item from the secure storage, and securely writing the confidential data item into one or more fields in said message prior to its encrypted transport to the remote server.

In accordance with the present invention, for example, the confidential data item may comprise at least one of: a password, a Personal Identification Number (PIN), a username, a string representing user credentials, a data item for authentication; wherein the SEE may comprise code to securely perform an encryption operation on said message prior to its transport to the remote server.

In accordance with the present invention, for example, the program code may comprise an application to transport the message to the remote server via a transport security protocol.

In accordance with the present invention, for example, the message is associated with a data object indicating a particular field in which the confidential data item is to be inserted by the rewriter module.

In accordance with the present invention, for example, a server or a computer may comprise: an authentication module to send, to a remote client device, a server authentication certificate; an accreditation certificate stored in a pre-defined location on the server, wherein the pre-defined location is accessible to the remote client device; wherein the accreditation certificate indicates a condition that the server authentication certificate needs to meet in order for the server authentication certificate to be accepted for authentication by the remote client device.

In accordance with the present invention, for example, the accreditation certificate is accessible for automatic polling by the remote client device based on a pre-defined storage location at which the accreditation certificate is assumed to be stored.

In accordance with the present invention, for example, the condition may comprise a reference to a public key of the server authentication certificate.

In accordance with the present invention, for example, the condition may comprise a reference to an issuer of the server authentication certificate.

In accordance with the present invention, for example, the condition may comprise a reference to a data-item unique to the server authentication certificate.

In accordance with the present invention, for example, the accreditation certificate is protected with a digital signature.

In accordance with the present invention, for example, the accreditation certificate is digitally signed by a first entity, and the server authentication certificate is digitally signed by a second, different, entity.

In accordance with the present invention, for example, the accreditation certificate has a timed-bound validity or an expiration time/date stamp.

In accordance with the present invention, for example, a mobile electronic device may comprise: an authentication module to receive, from a remote server, a server authentication certificate; an accreditation certificate fetcher to fetch an accreditation certificate; wherein the accreditation certificate indicates a condition that the server authentication certificate needs to meet in order for the server authentication certificate to be accepted for authentication by said authentication module of the mobile electronic device.

In accordance with the present invention, for example, the accreditation certificate fetcher is to fetch the accreditation certificate from a pre-defined location on said remote server which is accessible to the mobile electronic device.

In accordance with the present invention, for example, the accreditation certificate has a timed-bound validity.

In accordance with the present invention, for example, the accreditation certificate fetcher is to fetch the accreditation certificate from a local storage within the mobile electronic device.

In accordance with the present invention, for example, the accreditation certificate is hard-coded within an application running on the mobile electronic device.

In accordance with the present invention, for example, the mobile electronic device may comprise a device selected from the group consisting of: a smartphone, and a tablet.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

Figure 1A:
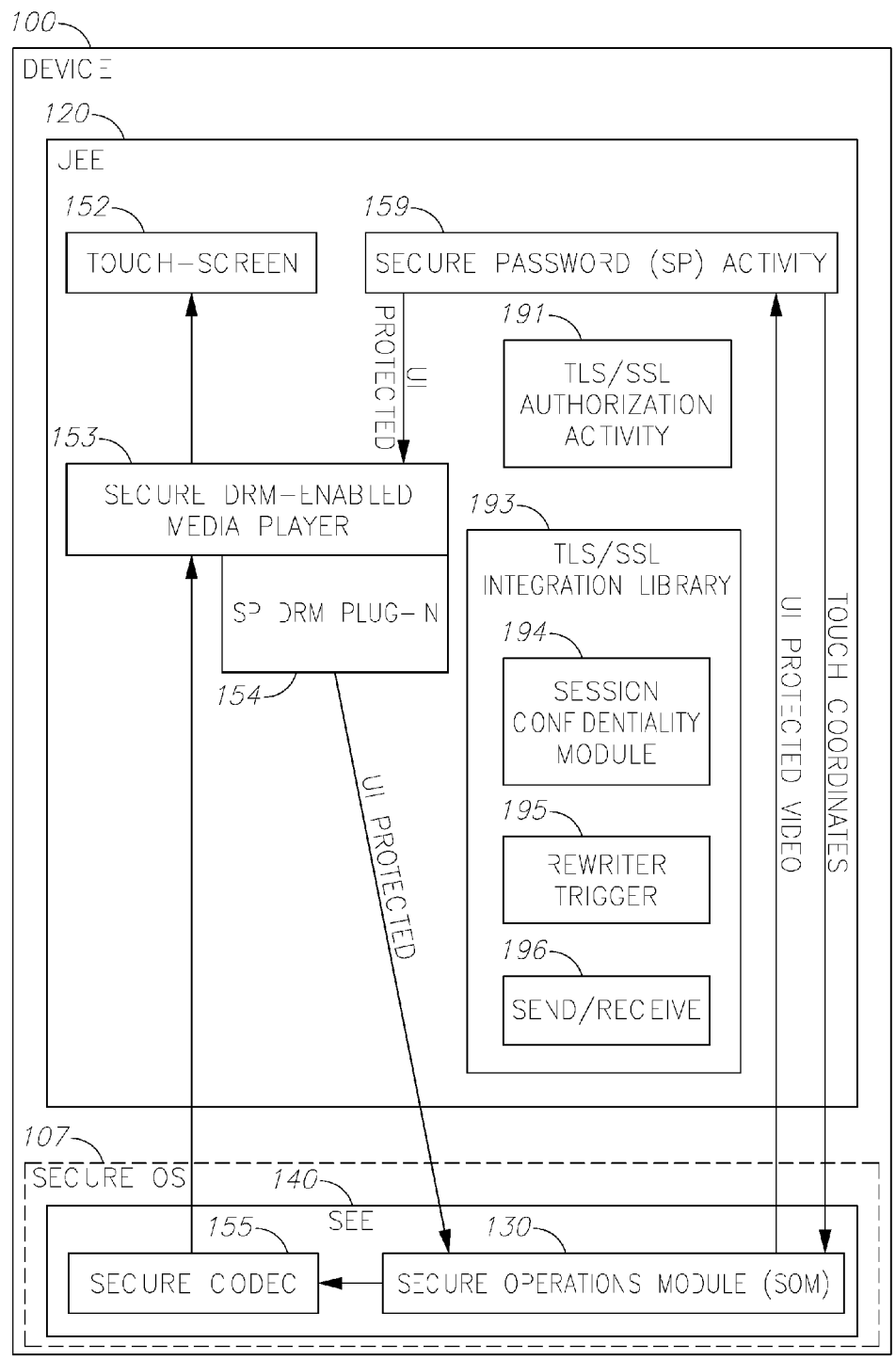
FIG. 1A is a schematic block diagram illustration demonstrating the architecture of a mobile device, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that in conventional systems, key-based authentication may be too complex to provision and manage, making it barely used in practice, which in turn leads to limited and fragmented support. Additionally, password-based authentication may not be properly deployed on mobile devices, due to user-interface limitations, as well as due to user inability to select or remember long cryptic passwords. Although "password manager" programs exist, they often require a long and cumbersome master password, or they often insecurely utilize passwords in the clear.

Applicants have further realized that even if deployed, a significant security flaw remains by carrying out authentication using logic that runs on top of a High Level Operating System (HLOS) of a mobile device, where keys and passwords may be captured by a malware software module. Furthermore, although local data protection may assist in protecting stored application data, this mechanism is seldom used, also due to the inability to present a reasonably secure solution that runs over the HLOS.

Applicants have also realized that some mobile devices may be equipped with a Secure Execution Environment (SEE), for example, facilitated by TrustZone Technology (available from ARM Holdings PLC of Cambridge, England, United Kingdom). However, the SEE may be tailored for protecting secure applications running within the SEE, rather than for assisting HLOS applications (e.g., most of the applications on the mobile device) protect themselves and their data. Furthermore, a conventional SEE may not provide a secure input mechanism, which is important for secure authentication. Applicants have further realized that a remote server may operate as a SEE.

The present invention may include methods, devices and systems for securely entering, transmitting, receiving and/or handling a password. Particularly, the present invention may provide the user of a mobile device, a computing device and/or a portable device with a secure unified component for authentication and authorization on behalf of the user. The secure password entry and handling of the present invention may be based on an agent module which may run in a secure execution environment (e.g., facilitated by TrustZone Technology, or by a remote server operating as a SEE), which may perform the authentication and authorization cryptographic computations using securely stored passwords and key material. Authentication and authorization on behalf of the user may be carried out only after the human user is positively identified using a secure password entry routine. The password entry routine may, by itself, be protected from malware-based password interception and/or entry, for example, by utilizing secure video path capabilities of the mobile device.

The present invention may securely handle passwords and may facilitate user authentication and authorization in a robust and user-friendly manner. For example, the present invention may provide the facility for secure storage of passwords and client certificates, and by enabling authentication-token based capabilities. Additionally, the present invention may utilize secure storage for passwords and keys, a Secure Password Entry Module (SPEM), and modules able to use the passwords and keys to securely authenticate the user of the mobile device on behalf of the user. Only upon secure entry of a correct user password, may a Secure Storage Module (SSM) allow other system components to use the credentials belonging to that user.

The present invention may allow, for example, secure password entry by utilizing a secure content path or a secure video path of the mobile device. Following the secure user authentication and authorization, the present invention may enable HLOS applications to protect their own authentication processes, as well as their own locally-stored data.

The term "password" as used herein may include, for example, a string of combination of characters representing a password, a passphrase, a Personal Identification Number (PIN), a string of characters utilized for authenticating a user identity and/or for authorizing a user's access to a service, or other secret data-item or signal shared between a user and a system and useful in authentication of the user to the system. Optionally, the term "password" may include other types of confidential or semi-confidential or non-confidential data items, for example, a username, a user nickname, a user ID string, a user identifier, a token, and/or other data items, particularly data item(s) which may be used in a user authentication process.

Reference is made to FIG. 1A, which is a schematic block diagram illustration demonstrating the architecture of a mobile device 100 in accordance with the present invention. Device 100 may be, for example, a cellular phone, a smartphone, a tablet, a laptop computer, a portable electronic device, a portable computing device, or other suitable computing device.

Device 100 may include one or more modules running in a Secure Execution Environment (SEE) 140 (e.g., a Trust-Zone Technology environment, optionally associated with a Secure Operating System (Secure OS) 107 such as, for example, MobiCore available from Giesecke & Devrient GmbH of Munich, Germany), and one or more modules running in an Unsecure Execution Environment (UEE) 120 (e.g., an Android environment).

UEE 120 may comprise, for example, a touch-screen 152, a secure DRM-enabled media player 153 which may be associated with a Secure Password (SP) DRM plug-in 154, a Secure Password (SP) Activity 159, a TLS/SSL integration library 193, and a TLS/SSL Authorization Activity 191.

SEE 140 may comprise a Secure Operations Module (SOM) 130 able to securely store, transmit, receive and handle user password(s) and/or PINs, as well as other keys and assets, without exposing such password(s) or PINs to UEE 120 or to any module or application within UEE 120, or to other attackers which may be internal or external to device 100. SOM 130 may be able to generate and send User Interface (UI) elements that will be rendered by a secure CODEC 155.

Figure 1B:
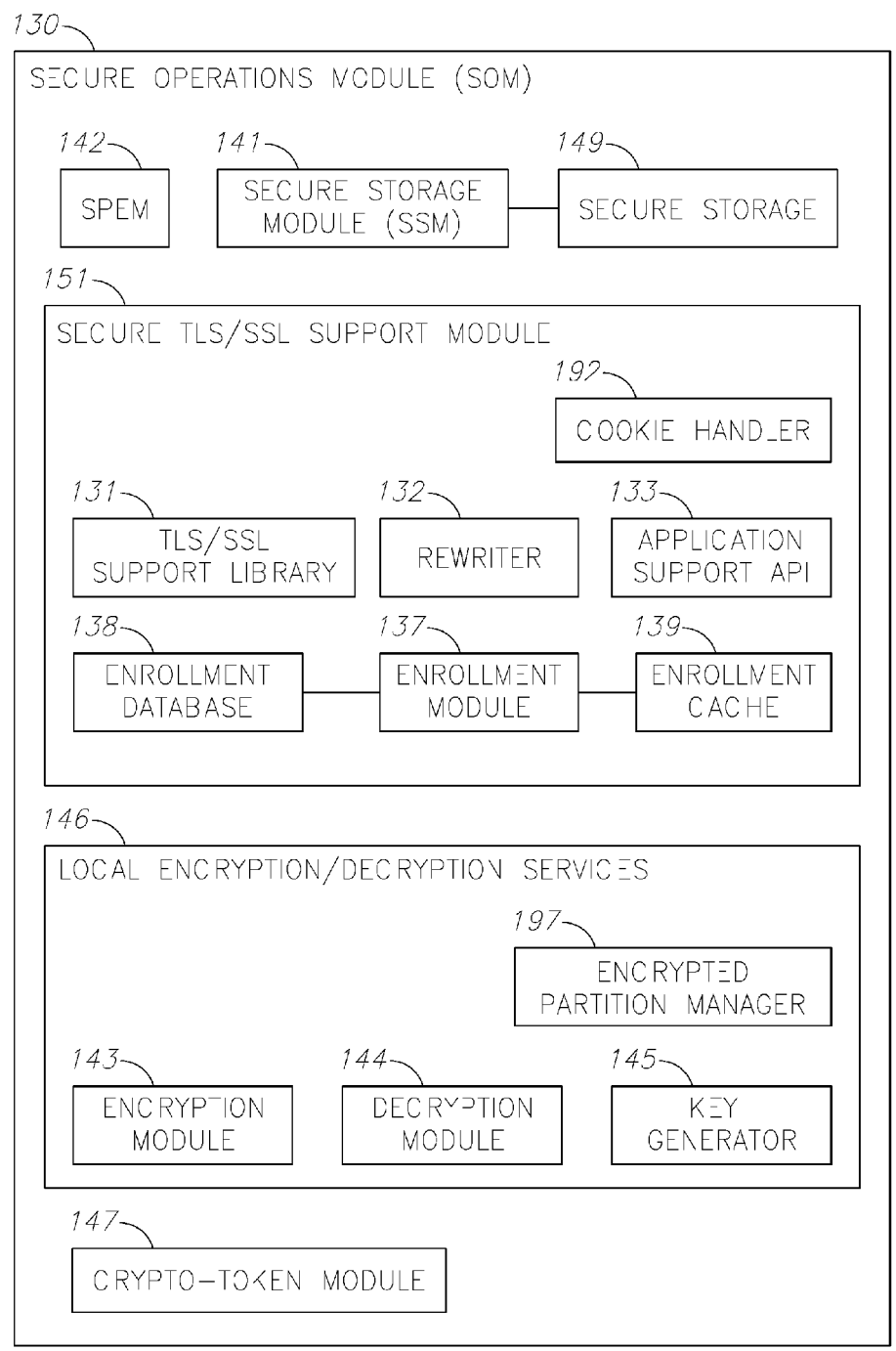
FIG. 1B is a schematic block-diagram illustration of a Secure Operations Module (SOM) and its components, in accordance with some demonstrative embodiments of the present invention.

Reference is also made to FIG. 1B, which is a schematic block-diagram illustration of SOM 130 and its components, in accordance with the present invention. SOM 130 may comprise, for example, a Secure Storage Module (SSM) 141 associated with a Secure Storage 149; a Secure Password Entry Module (SPEM) 142; a secure TLS/SSL support module 151; a local encryption/decryption services module 146; and an optional crypto-token module 147.

Secure TLS/SSL support module 151 may comprise, for example, a TLS/SSL support library 131; a cookie handler 192; a rewriter 132; an application support API 133; and an enrollment module 137, which may be associated with an enrollment database 138 and an enrollment cache 139. For demonstrative purposes, enrollment database 138 is shown as part of secure TLS/SSL support module 151, although in some implementations, enrollment database 138 may be stored within secure storage 149.

Local encryption/decryption services module 146 may comprise, for example, an encryption module 143, a decryption module 144, a key generator 145; and an encrypted partition manager 197.

Secure storage 149 may be a memory unit (or a dedicated portion or segment of a memory unit or memory area), in which confidential data may be stored. SSM 141 may be a secure software module which may control the writing into (and the reading from) secure storage 149. For example, SSM 141 may be an application running in SEE 140, and may facilitate storage in secure storage 149 of passwords, client certificates, private encryption keys, other types of cryptographic credentials which may be used in cryptosystems, or other data that needs to be kept secure.

Each one of the cryptographic credentials in SSM 141 may be associated, for example, with a User-ID (associating a cryptographic credential with a user identification) and with a Service-ID (associated a cryptographic credential with an identifier of a service to which the user authenticates using that cryptographic credential). The Service-ID may be an identity obtained from a Service Certificate which may be issued to every service provider (or application) that enrolls to use a mechanism of the present invention. This new type of digital certificate (not to be confused with an X.509 Certificate, a Transport Layer Security (TLS) certificate or with a Secure Sockets Layer (SSL) certificate) may allow the service provider full flexibility when using different TLS certificates while providing protection to the end-user against phishing attempts.

Passwords which may be stored in SSM 141 may be numeric passwords, alpha-numeric passwords, strings of alphanumeric and/or non-alphanumeric characters, or the like. The digital certificates that may be stored in SSM 141 may be client certificates, for example, in accordance with ITU-T standard X.509, and/or a private key. Additionally, SSM 141 may store the password assigned to each User-ID, as well as information necessary to securely recover a personal user-selected image which may be associated with each User-ID and may be utilized in the authentication process as described herein.

Secure Password Entry Module (SPEM) 142 may run in SEE 140, and may be responsible for polling a user for his password, prior to using any of the secure storage credentials to authenticate on behalf of that user. SPEM 142 may utilize a Secure Video Path (SVP) feature of device 100 to display to the user an on-screen keyboard or an on-screen keypad which cannot be intercepted by a malware module which may be running on device 100. The present invention may thus utilize a secure content path or SVP feature of device 100, originally intended for the secure display of protected media content, e.g., Digital Rights Management (DRM)-protected content, for a different purpose of securely communicating an on-screen virtual keypad/keyboard.

For example, when a user needs to be asked for his password, SPEM 142 may utilize SVP to securely render and present on the screen of device 100: (a) a background image which comprises, or is constructed based on, a personal image previously-selected by the user; (b) a shuffled or scrambled on-screen keypad or keyboard, such that on-screen keys that represent digits and/or letters appear, at each invocation, at random or pseudo-random locations, in a randomly or pseudo-randomly scrambled order, or in an order which is randomly or pseudo-randomly different from their regular order in a conventional physical keyboard or keypad; the identity of the service provider, as securely obtained from, or otherwise pointed by, the Service Certificate. The user may enter his password by tapping, touching, clicking, or otherwise selecting keys on the scrambled on-screen keyboard or keypad. The coordinates of the user's key-presses may be communicated from a driver of the touch-screen of device 100 (e.g., running in UEE 120, for example, an insecure High-Level Operating System (HLOS) such as Android) to SPEM 142 which runs in SEE 140. As the user enters his password, SPEM 142 may convert the coordinates into pressed letters or digits, based on the notion of where each letter or digit was displayed in the current invocation of the randomly scrambled on-screen keyboard or keypad. It is noted that the display of the user-selected personal image may allow the user to ascertain that the user is entering his password into a genuine interface rather than into a phishing web-page or mock website. Similarly, the description of the service provider may allow the user to assure that the proper service provider is being authenticated to.

Secure TLS/SSL support module 151 may utilize the user's cryptographic credentials, which are stored in SSM 141, in order to authenticate on behalf of the user, after the user correctly enters his password. As mentioned above, the user's cryptographic credentials stored in SSM 141 may be, for example, either a user-designated password, or a TLS client certificate (along with a private key). If the user credential is a client certificate with a private key, then the private key may be securely incorporated into the TLS handshake. If the user credential is a password, then that password may be used in TLS either through rewriter 132 or through Application Support API 133, as described herein. It is noted that at least part (or all) of the TLS/SSL implementation may be executed in SEE 140, to eliminate any need for processing user credentials over the HLOS or in UEE 120 of device 100.

Secure TLS/SSL support module 151 may utilize client certificates in accordance with the TLS protocol during the handshake phase. In accordance with the present invention, part of a TLS implementation may run in SEE 140, thereby allowing the securely stored private key that belongs to the client certificate to be incorporated into the handshake process, without ever having to expose it to the HLOS or to UEE 120.

Secure TLS/SSL support module 151 may optionally comprise rewriter 132, for example, a HyperText Transfer Protocol (HTTP) rewriter. When passwords, rather than client certificates, are used with TLS/SSL for authentication, such passwords may not be passed as part of the TLS/SSL handshake. Instead, such passwords may be transferred after the handshake process may be completed, as session data (e.g., in accordance with a RESTful authentication method). For example, a password entered by the user may be communicated to a remote web-server over an HTTP POST command that is part of the HTTP interaction with the website. In a conventional system the TLS/SSL protocol implementation may be oblivious of this password, and may be agnostic to any data that the web browser (or other application) sends to or receives from the web-server: a conventional TLS/SSL implementation merely encrypts and decrypts the session data without caring for its contents. In contrast, rewriter 132 may be a component of secure TLS/SSL support module 151, which breaks the TLS/SSL obliviousness towards the data being encrypted and/or decrypted. Rewriter 132 may run in SEE 140, and may provide the part of the to-be-encrypted record (e.g., input provided on a web page) which contains the password. This may allow the password to be securely stored by SSM 141 without ever having to be delivered in the clear to the HLOS or to UEE 120 during that TLS invocation. For example, rewriter 132 may replace the contents of form fields in a submitted HTML page, with entries obtained securely within SEE 140 from SSM 141. Rewriter 132 may be able to replace all (or some) of the user fields in the form page, with entries retrieved securely within SEE 140 from SSM 141; or, rewriter 132 may replace only password field(s) in the submitted HTML page with the relevant password(s) obtained securely within SEE 140 from SSM 141. Password fields in a submitted HTML page may be recognized based on their unique field type.

It is noted that rewriter module 132 is described herein in terms or "rewriting", although in some implementations it may operate as a "writer" module which may write original data into suitable field(s) rather than rewriting or replacing data (or fake data). In other implementations, rewriter module 132 may operate as a replacer module or a substitution-performing module, as described.

It is further noted that rewriter module 132 may receive from one or more sources (e.g., from a service certificate; from a password field; from a browser) indications of which field(s) to write or rewrite or replace; and/or may automatically infer or deduce which field(s) or location(s) require rewriting or content replacement.

Secure TLS/SSL support module 151 may optionally comprise Application Support API 133. For example, a password may be sent from device 100 to a remote server not through a web browser, but through a local application running on device 100 (e.g., if the interaction between the user and the remote server does not occur over a web browser, but by a user running a dedicated downloaded or pre-installed application). The local application may create its own connection to the remote server. Traffic outgoing to the remote server may be, for example, wrapped as XML, being passed along as HTTP traffic. In some cases, there may be no HTML forms that are filled by the user, but rather, there may be local forms displayed on device 100 by the local application, with the local application pre-processing the form contents before sending them to the remote server. Since the password is not entered in a typical HTML form, rewriter 132 may not be operable to replace HTML field content. A conventional local application which sends secure traffic, may utilize a pre-provided OS implementation of the TLS/SSL protocol, and may thus still use the secure TLS/SSL implementation provided by secure TLS/SSL support module 151. However, since rewriter 132 may not be able to determine where and how to paste the securely-stored user credential, it may be required indirectly by the local application to provide such information. Application support API 133 may provide an interface to application providers and application developers, which may be utilized by a local application in order to cause secure TLS/SSL support module 151 to insert securely stored credentials into TLS/SSL connections that the local application maintains with a remote server.

Encryption module 143 and decryption module 144 may allow SOM 130 to support local data protection by using data encryption in a robust way. Each application that attempts to keep its data protected may be provided access to a "virtual partition", for example, in the form of a Linux mount under the application's regular data directory. The application may treat this directory in the same way that it treats any other directory, for example, by creating, writing, reading, deleting and/or modifying file(s) in such virtual partition directory. However, the content of the virtual partition directory may be transparently encrypted (and decrypted, as needed) by SOM 130. Accordingly, the application provider or developer may not be required to have any understanding of how encryption works, or to account for such encryption in any way other than by storing files in that virtual partition sub-directory rather than in the parent directory of the local application. The encryption and decryption operations may be performed by encryption module 143 and decryption module 144, respectively, e.g., using Advanced Encryption Standard (AES).

In a demonstrative implementation, the encryption/decryption key may be internally generated by key generator 145 within SEE 140, for example, as a function of the User-ID and the Service-ID. The key may be securely stored by SSM 141, and may be unique for each device, for each User-ID, and for each application. Alternatively, it may be securely derived whenever it is needed. This architecture limits the scope of damage from a leaked key, prevents encrypted data from being usable on other devices, and prevents a first local application from reading data associated with a second local application. Similarly to other security features provided by SOM 130, use of the key by an application may be granted only after the user provides his consent using SPEM 142. For example, SPEM 142 may ask the user for his password, while securely displaying the human-readable Service-ID of the application that is seeking encryption/decryption with its key. If the user approves the usage of the particular key (belonging to the particular application), then the proper key may be loaded and the hidden mount (the virtual partition directory) may appear and may be usable by that particular application.

It is noted that other means may be deployed at the HLOS level to form an additional layer of security, for example, by ensuring that a request for a key is issued only by an unmodified application for which the key was generated. This feature may be provided in addition to the display of the application identity when seeking user approval for using the encryption key.

It is noted that in some alternative implementations, a local application may not access transparently-encrypted mounted volumes or virtual partitions, but rather, may store its application data regularly, while accessing the data by utilizing modified functions which may be provided as part of SOM 130. Such modified functions may take care of the transparent encryption and decryption of files and/or data without affecting file locations.

SSM 141 may provide secure storage services for passwords, client certificates, and other information that needs to be stored only in encrypted form and/or integrity-protected form. SSM 141 may build a primitive database abstraction on top of secure storage facilities which may be provided by a Secure OS of SEE 140. SSM 141 may keep each data item associated with the respective User-ID and Service-ID, for example, represented using encrypted XML files (or other suitable representation formats), holding the data provided by upper layers. In order to achieve compatibility with a wide range of types of Secure OS, the SSM 141 may rely exclusively on the platform services of Secure OS for accessing a device-unique key and for storing a copy of the Initialization Vector (IV) used for each encrypted file.

Secure Password Entry Module (SPEM) 142 as well as associated secure code may be invoked by an application running on device 100 (e.g., an Android application if device 100 runs Android OS) requiring access to secure assets. SPEM 142 may display on a touch-screen display unit of device 100, for example, a password (or PIN) entry screen. SPEM 142 may then receive the user's input (password), and if the password is correct, SPEM 142 may enable access to the relevant secure assets.

In some implementations, secure password entry may span over both SEE 140 and UEE 120, and may involve, for example, all or some of the components of FIG. 1A.

SP activity 159 may be an Android activity (e.g., Java activity), invoked in response to an intent posted from other application(s). For example, a local Android application requiring access to a password-protected asset may use an instance of a secure component to generate a request and sign it with the request key (which may only be accessible to secure components). The application may then issue a startActivityForResult( ) to invoke SP Activity 159 and send the signed request it received from the instance of the secure component. Then, SP Activity 159 may send its response encrypted by another device-specific key available only to secure components, which the requesting application provided to the relevant secure component instance. The request and the response may further include a cryptographic nonce generated by the requesting application, in order to prevent reuse of old or previous response(s). The requesting application may be, for example: a secure application requiring password authentication services; a HLOS application, requiring password authentication, e.g., to protect its local storage using the secure component described herein; or a TLS Activity serving an application that utilizes TLS connections, as described herein.

Secure video path may ensure that an incoming protected video (or image, multimedia file, or the like) is securely decrypted by the scheme used to protect it, within device 100, and is securely displayed on touch-screen 152 in a way that bypasses the HLOS, and thus prevents the video/image from being captured. The present invention may thus utilize and leverage the capabilities of secure video path, for example, by creating the image of a scrambled PIN pad (or other suitable type of on-screen input interface) as a secure image/video, encoding it like a video, and wrapping it in a certain protection scheme, in SOM 130. The protected video may then be delivered to SP activity 159. SP activity 159 may transfer the protected video to the secure DRM-enabled media player 153 available by device 100. Secure DRM-enabled media player 153 may identify that the video is an encrypted video based on a certain DRM scheme, and may pass the encrypted video to the suitable DRM plugin 154, which in turn may utilize the services of SPEM 142 in SOM 130 to decrypt the encrypted video. The decrypted video may be transferred to secure codec 155 which may render it securely onto touch-screen 152.

A suitable mechanism may be used to allow conversion of touch events, performed by a user on touch-screen 152, into secure identification within SOM 130 of the keys that correspond to those touch events. SOM 130 may generate a scrambled PIN pad or other scrambled password-entry interface; touch events are transferred from the Activity that detects them to SOM 130, which in turn may convert them into the entered PIN. Since SOM 130 generated the scrambled password-entry interface, and the scrambled password-entry interface may be displayed securely by leveraging the capabilities of secure video path, then SP activity 159 or other components of HLOS 120 may not be capable of determining what was drawn on touch-screen 152 that the user pressed on. Therefore, SP activity 159 may only identify coordinates of the user's finger(s), for example, indicating that the user tapped on an upper-left region of touch-screen 152, but not knowing which key was displayed at that region of touch-screen 152 as part of the scrambled password-entry interface (e.g., scrambled PIN pad) that was generated securely by SOM 130 and was displayed securely via secure video path 150. SP activity may thus "blindly" pass the touch-event coordinates to SOM 130, which in turn is able to securely determine which character (e.g., digit, symbol, or letter) was displayed under each of the points that the user touched, and SOM 130 may thus securely convert the touch-event coordinates back into PIN digits or password characters.

Most of the logic at the Android or Java level of Password Entry Activity 159 may concern required interactions with the OS, for example, acquiring access to touch-screen 152, or driving the platform's hardware CODEC to display the User Interface (UI) generated by the secure component). The activity logic may drive user interaction by displaying the UI as a full-screen video surface, employing secure video path to prevent "snooping" of the UI, and directing touch events on touch-screen 152 to SOM 130.

Figure 1C:
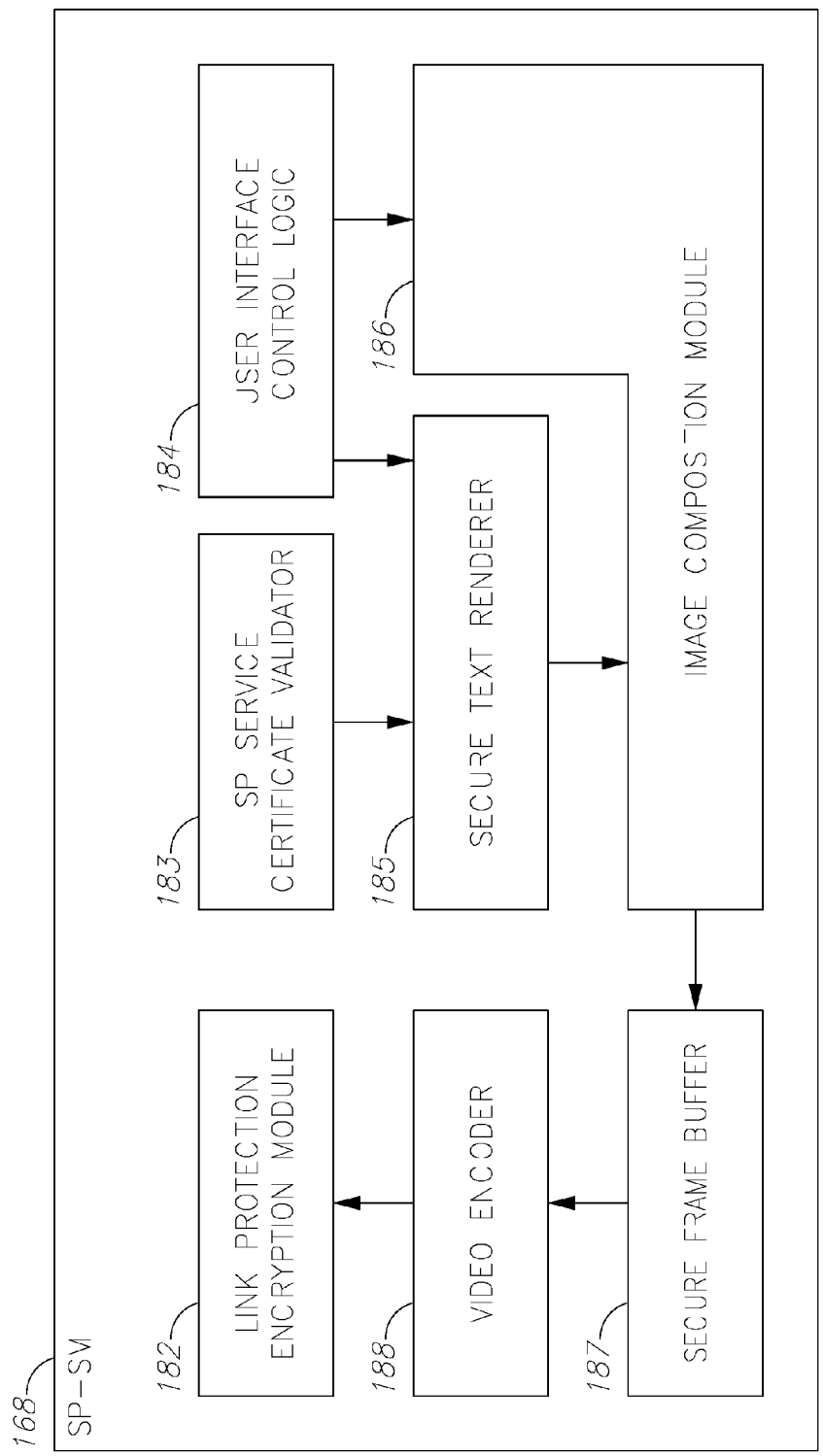
FIG. 1C is a schematic block diagram illustration of Secure Password Secure Module (SP-SM), in accordance with some demonstrative embodiments of the present invention.

Reference is made to FIG. 1C, which is a schematic block diagram illustration of Secure Password Secure Module (SP-SM) 168 in accordance with the present invention. SP-SM 168 may be a demonstrative implementation of SPEM 142.

SP-SM 168 may comprise, for example, a link protection encryption module 182, a SP service certificate validator 183, a UI control logic 184, a secure text renderer 185, an image composition module 186, a secure frame buffer 187, and a video encoder 188 (e.g., utilizing H.264 or other suitable CODEC).

SP-SM 168 may run in SEE 140 and may generate the UI for secure password entry for example, as a background PNG picture of the user-selected personal image and overlays. SP-SM 168 may react to touch events arriving from SP Activity 159; may update the display to reflect UI progress; may encode the UI to a video (e.g., by utilizing H.264 or other suitable video codec); and may protect the encoded video using a custom protection scheme, such as a DRM protection scheme.

UI control logic 184 may implement a graphics library. UI control logic 184 may be based on a PNG decoder and a TrueType font renderer, and may draw random or pseudo-random or scrambled digits (or characters). Secure text renderer 185 may render text of the context (e.g., the Service-ID), whereas image composition module 186 may compose an image of the digits and text together with the personal reassurance image. Video encoder 188 may encode the display output into an H.264 video stream (or other suitable video stream or video clip or video file, encoded using other suitable standard or protocol), which may be encrypted (e.g., using AES-CTR) with a randomly-generated per-session key. This may allow utilization of a platform-defined secure content path or secure video path, which is designed for using secure display for DRM-protected video.

UI control logic 184 may be responsible for drawing a scrambled PIN pad layout, a scrambled password-entry interface, a set of rotatable dials having a random initial value, or the like. UI control logic 184 may create an image of such PIN pad or password-entry interface. SP service certificate validator 183 may receive and check an "accreditation certificate" (or "service certificate"), and, if valid, may obtain from it the service provider name. Secure text renderer 185 may obtain the ID or name of the service provider from the certificate processed by service certificate validator 183, and may obtain other textual details about the context of the authorization required (for example, amount paid in a commerce context; or service provider details in a TLS context). UI control logic 184 and secure text renderer 185 may operate to draw the text on the image (e.g., textual details and the name of the service provider), using its own version of secure fonts, to avoid using unsecure font(s) of the HLOS. Image composition module 186 may take all the graphics created for the PIN-pad (or password-entry interface), as well as the service details and the personal assurance image, and may compose out of them a combined image which may then be passed to secure frame buffer 187, which comprises an image buffer. Secure frame buffer 187 passes one or more buffered image(s) or frame(s) to video encoder 188, which generates a video therefrom (e.g., a video file encoded with H.264). The encoded video is passed from video encoder 188 to link protection encryption module 182, which generates the random or pseudo-random key, encrypts the video with it, and wraps it or encapsulates it as protected video (e.g., Widevine video, PlayReady video), which may then be passed back to the SP activity 159. Optionally, SP-SM 168 may further implement a CryptoPlugin:decrypt function, to decrypt the custom DRM-like protection scheme. This may allow integration of the password entry display into an existing secure content path (or secure video path) on any platform supporting CryptoPlugin (e.g., used for PlayReady and Widevine).

Referring again to FIGS. 1A and 1B, secure TLS/SSL support module 151 may comprise TLS/SSL support library 131 that runs in the secure execution environment, and communicates with TLS/SSL integration library 193, running in UEE 120. TLS/SSL integration library 193 may further comprise a full TLS/SSL implementation in user-space. For example, TLS/SSL integration library 193 may comprise an enhanced TLS/SSL library (e.g., a TLS library), which augments the TLS/SSL implementation in the HLOS with SEE-based secure session establishment, and may provide optional support for protecting user credentials (e.g., passwords and client certificates) by the SEE, such as by interacting with TLS/SSL support library 131 running in the SEE. When SEE-based operation is enabled, TLS/SSL integration library 193 may process the TLS handshake protocol using TLS/SSL support library 131 running in the SEE (or on the server). The secure TLS/SSL integration library 193 may operate in one of two modes: it may use the secure component running in the SEE for the handshake phase only, or it may use the secure component for the handshake phase as well as for the encryption and decryption of records.

Operation of TLS/SSL support library 131 may be triggered or invoked by a triggering condition or event, for example, identifying that a website has a Service Certificate. TLS/SSL integration library 193 may fetch the Service Certificate from a well-known URL on the website during initialization. If the website is not yet known to device 100, then an "enrollment mode" (e.g., a "first-time wizard") may be initiated by enrollment module 137 (e.g., a website enrollment module and/or an application enrollment module, which may be part of TLS/SSL support library 131, and may comprise an enrollment database 138 of previously-enrolled websites and/or applications, as well as a non-persistent enrollment cache 139 of non-enrolled websites), allowing the user to enter his username, his password, and optionally other identifying details. The application or browser may then cause the storage of the confidential identification details in secure storage (e.g., using extended APIs provided by TLS/SSL support library 131) for use in subsequent connections to the service.

Figure 2:
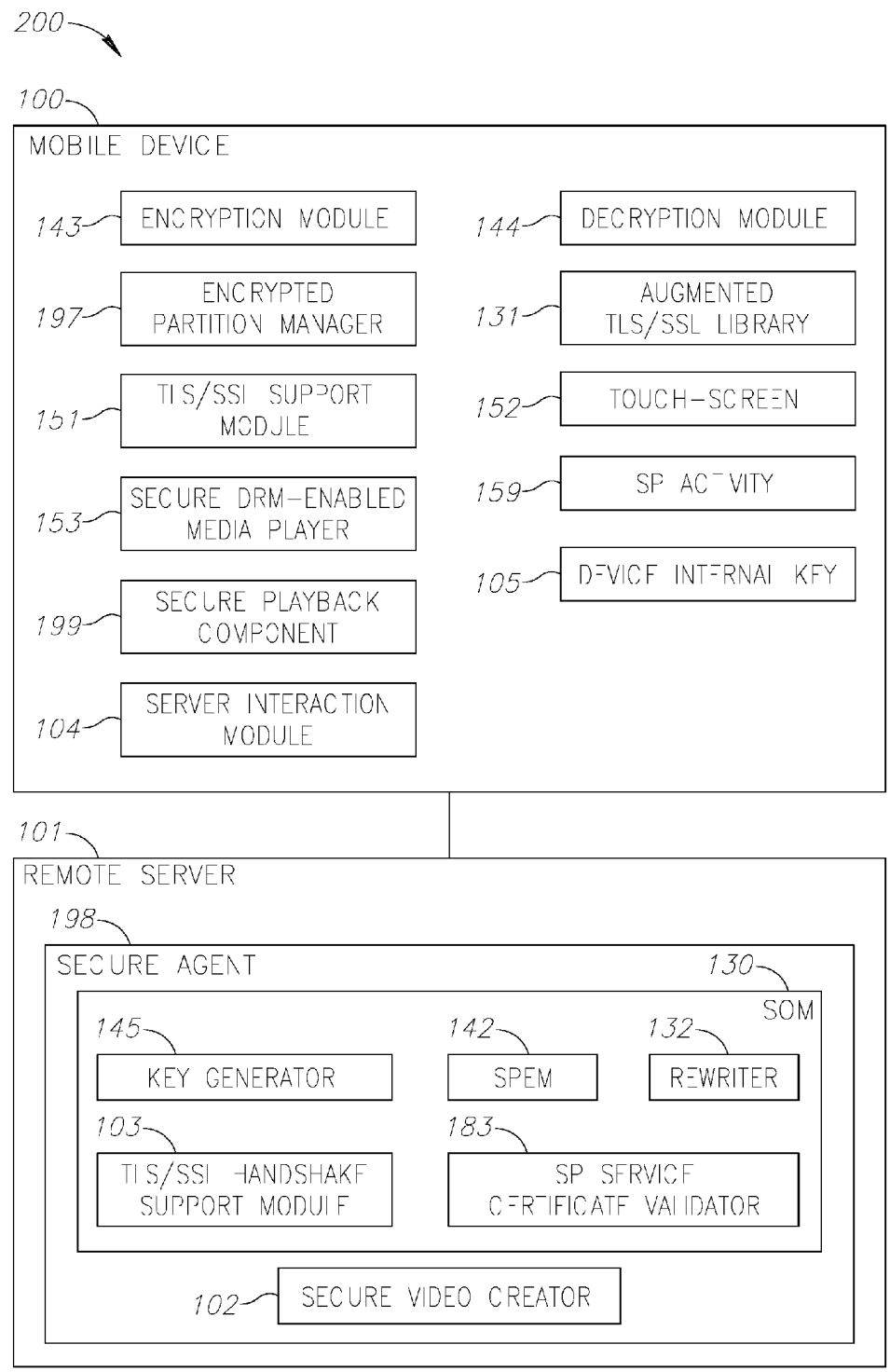
FIG. 2 is a schematic block diagram illustration of system, in accordance with some demonstrative embodiments of the present invention.

Once the handshake is completed, if user credentials protection is not required, then the secure component (or the server, in a remote server implementation as demonstrated in FIG. 2) may return the agreed-upon session keys to the HLOS library layer, thereby minimizing the performance impact of a split architecture. This mode may be deployed when authenticating the user using a client certificate, as described above.

Secure credentials handling may require TLS/SSL integration library 193 to operate in a different manner: when this mode is enabled, a new API may be used to cause rewriter 132, which may be part of secure TLS/SSL support module 151, to send a specified credential (e.g., password) into the encrypted stream. To prevent malware running over the HLOS from capturing the credential from the encrypted stream, the session key may not be exported from the secure environment (or the server, in a remote server implementation as demonstrated in FIG. 2); rather, every encryption (or decryption) operation may be directed to the secure component.

The application may still request to switch to the HLOS-based payload processing mode after sending the credentials. The mode switch may cause TLS/SSL integration library 193 to perform an abbreviated TLS renegotiation, generating a new key for use in the continued session. The Service Certificate may include information pertaining to the authorization for the fall-back into HLOS-based payload processing.

As demonstrated herein with reference to FIG. 2, TLS/SSL support library 131 (or, a TLS/SSL handshake support module 103, able to perform a similar role) may run on a remote secure proxy server. In such case, traffic from mobile device 100 to the secure proxy server may be protected using a data protection module for communicating securely towards the secure proxy server, and the secure proxy server maintains the TLS connection with the actual service server, on behalf of Device 100. If renegotiation is done, the TLS session may resume, following renegotiation from mobile device 100 to the service server (TLS server), no longer going through the secure proxy server.

Local encryption services module 146 may comprise a library that allows local HLOS applications to trigger encryption and/or decryption processes using securely stored keys, to protect local data. Local encryption services module 146 may provide services to applications requiring secure local storage. Local encryption services module 146 may include, for example: an Android activity for communication with the client applications; a system daemon for managing secure mount points; and a secure component for actual encryption and decryption of stored data.

In a server implementation (e.g., as demonstrated in FIG. 2), a key generator 145 may run on the server, whereas encryption module 143 and decryption module 144 may reside and run on mobile device 100, but in its HLOS. Encryption module 143 and decryption module 144 of device 100 may interact securely with the remote server in order to obtain the relevant key, after the server authenticates the user with its secure password entry module 142. Once the server authenticated the user, the server may make the correct key available to the encryption module 143 and decryption module 144 of device 100.

Crypto-token module 147 may allow applications to trigger authentication and digital signature routines to be performed using securely stored keys, as described herein.

Components of SOM 130 may be integrated into mobile device 100, at the HLOS (e.g., Android) level and at the Secure OS level, as detailed herein. Components of SOM 130 may also be integrated in a remote server (e.g., as demonstrated in FIG. 2)

It is noted that components of SOM 130 may be implemented in SEE 140 or in the remote server. In some implementations, utilization of crypto-token module 147 may require a "token conduit" in UEE 120; the token conduit may be an Activity able to interact with crypto-token module 147 of SOM 130, to enable crypto-token module 147 to perform cryptographic operations with credentials stored by SSM 141 in secure storage 149.

At the HLOS level, TLS/SSL Authorization Activity 191 may be used. In order to enable the secure operation of TLS/SSL support library 131, an application may need to request user authorization for using the user's credentials (e.g., either a password, or a private key associated with a client certificate). The authorization request may be accomplished by issuing an Android Intent with, e.g., the website's URL, or any other service identifier, and an optional User-ID. This may invoke TLS/SSL Authorization Activity 191, which may issue an HTTP HEAD request to the website in order to retrieve the website's TLS server certificate. The TLS/SSL Authorization Activity 191 may then invoke a Secure Password request in order to display some available information, such as: website's URL, common name of the website from the Service Certificate, and/or the User-ID. The user-supplied password may then unlock, or authorize, the access to the user's digital certificate and/or password.

Once the user authorized the use of his credentials, TLS/SSL Authorization Activity 191 may return a secure "cookie" value to the application. The secure "cookie" value may then be used (e.g., verified) by cookie handler 192 to enable the secure operation of the TLS/SSL support library 131. The secure "cookie" may be generated by secure TLS/SSL support module 151. The secure "cookie" may be verified by cookie handler 192 of secure TLS/SSL support module 151, which may perform cookie creation and/or cookie verification; an invalid or stale "cookie" may not leak any unexpected capabilities. For demonstrative purposes, cookie handler 192 is shown as part of secure TLS/SSL support module 151; although cookie handler 192 may be implemented as part of, or may be associated with, one or more other modules, for example, TLS/SSL support library 131, SPEM 142, local encryption/decryption services module 146, and/or crypto-token module 147.

TLS/SSL support library 131 may augment conventional capabilities of a TLS/SSL library. TLS/SSL support library 131 may comprise an additional module for authorizing secure operation; this module may be associated with API which may be a Java function, which may invoke the TLS/SSL Authorization Activity (via an Android Intent) and may update internal state according to the results. TLS/SSL support library 131 may further comprise, for example, a new function, which may add the ability to set an SSL session object to high-confidentiality mode (performing encryption/decryption in the SEE 140), enabling the utilization of secret user credentials. Changing the mode on an already-active session (e.g., where data has already been exchanged) may cause TLS/SSL support library 131 to trigger an abbreviated renegotiation of the TLS connection, resulting in a changed key being used thereafter. TLS/SSL support library 131 may also comprise a new function, which may accept the name of a (previously-enabled) user credential, and may instruct rewriter 132 to write the value of this user credential into the output stream; the SSL_session_object should be in high-confidentiality mode when this function is used.

TLS/SSL support library 131 may further interact with the corresponding TLS/SSL integration library 193 in the HLOS of device 100. TLS/SSL integration library 193 may comprise, for example, a session confidentiality module 194 able to set and/or modify a session confidentiality flag or parameter (e.g., toggle between "high" and "low", or vice versa); a rewriter trigger 195 able to identify that rewriter 132 needs to be invoked; and a send/receive module 196 able to interact with TLS/SSL support library 131 and able to send to (and receive from) TLS/SSL support library 131 data to encrypt or decrypt.

Internally, TLS/SSL integration library 193 may dispatch functions to either a copy of the HLOS-based TLS/SSL implementation or to TLS/SSL support library 131. The HLOS version of the code may be used for SSL_write/SSL_read as long as the session is not in high-confidentiality mode. The HLOS version of the code may also be used for session establishment (e.g., SSL_connect) if access to secure credentials has not been authorized.

Components of SOM 130 may also be integrated into the Secure OS level. For example, SOM 130 may comprise modules running in SEE 140, under control of SEE 140. These modules may be implemented as "secure applications": they may use Secure OS services, and may be loaded like other secure services (e.g., as used for DRM). The secure modules may comprise, for example, Secure Password Entry Module (SPEM) 142, a secure TLS/SSL module (e.g., secure TLS/SSL support module 151), Secure Storage Module (SSM 141), and encrypted partition manager 197.

SPEM 142 may implement the user interface for secure password entry. The input received by 142 may be a "password request", for example, the website's details (domain and name from the Service Certificate) and the User-ID to use for logging into the website, all signed with a secret key. The output generated by SPEM 142, if the password entered is correct, may be a user-specific and service-specific secure storage key, encrypted for use solely by the secure component requesting authentication. The secure storage keys may be derived from a device-private master key using a deterministic Key Derivation Function (KDF) which may utilize, as parameters, the User-ID and the Service-ID, as well as additional data.

Secure TLS/SSL support module 151 may implement a minimal TLS, e.g., TLS v1.2, stack, and may support DHE_RSA-based handshake and key exchange, as well as AES-based record payload protection, as well as other modes. Secure TLS/SSL support module 151 may be initialized by accessing a service parameters package, containing the server's Service Certificate and user's credentials. The service parameters package may be stored in SSM 141, and access to the service parameters package may require a password provided using SPEM 142. TLS/SSL support module 151 may further enable user enrollment, which may create a service parameters package and may stores such package (through SSM 141) in secure storage.

SSM 141 may handle the confidentiality and integrity of service parameters and user parameters. SSM 141 may be invoked directly from other secure modules (e.g., from SSL/TLS support module 151), and may manage the encryption and signing of provided data using SEE-internal keys.

Encrypted partition manager 197 may be part of, or may be separate from, local encryption services module 146. For example, encrypted partition manager 197 may handle encryption and decryption of data involved in file access operations of local applications utilizing the local data protection feature, as described above. In some embodiments, the application may directly utilize the encryption and/or decryption functions of local encryption services module 146; whereas in other embodiments, encrypted partition manager 197 may create an encrypted partition which the application may then transparently use.

Local encryption services module 146 may provide local encryption and decryption functionality. Sensitive data of each local application may be locally stored as an encrypted sub-volume; the sub-volume may be backed by a file stored inside the application's data directory, or at any other location. Each such sub-volume may be encrypted using a different key, derived from the device master key using a secure KDF parameterized by the User-ID and the application identifier (package name). Alternatively, the key may be generated randomly or pseudo-randomly. The encryption may utilize AES-XTS for the data sectors, and may scramble the sector addresses using an AES-driven Thorp shuffle. Other suitable ciphers and/or modes may be used.

Initially (e.g., at system start-up), the sensitive data containers may be closed. When an application needs to access its sensitive data, the application may invoke the Android Binder InterProcess Communication (IPC) mechanism to request access from a "secure storage manager" daemon (e.g., started at system boot) which may be implemented as encrypted partition manager 197. Encrypted partition manager 197 may issue a Secure Password request in order to access the user's master key. Encrypted partition manager 197 may manage the mounting and un-mounting of protected volumes using a Linux Network Block Device (NBD) mechanism, and may implement the server-side logic for these volumes, accessing the backing files and performing encryption/decryption using a secure component, such that the keys used for encryption and decryption may never leave the secure component. Encrypted partition manager 197 may also utilize Android Binder mechanisms to detect when a local application is closed or "killed", and un-mount any protected volumes mounted on behalf of that local application.

FIG. 2 is a schematic block-diagram illustration of a system 200 in accordance with the present invention. System 200 may include mobile device 100, which may be able to communicate with a remote server 101 over one or more communication networks, wireless links and/or wired links.

Server 101 may comprise a secure agent 198, for example, a secure component or secure environment which may be generally similar to SEE 140. In some implementations of system 200, device 100 may not comprise a SEE; or, device 100 may comprise a SEE but such local SEE of device 100 may be un-usable or need not be used by the present invention. Accordingly, SOM 130 may be implemented within secure agent 198 of server 101 (instead of being implemented within a SEE internal to device 100). Secure agent 198 of server 101 may further comprise a secure video creator 102, which may be responsible for the functions of some or all of the components of FIG. 1C, particularly for the functions associated with link protection encryption module 182 and video encoder 188. Secure video creator 102 may generate a DRM-encrypted video representing an on-screen scrambled PIN pad (or other suitable scrambled password-entry interface). Secure video creator 102 may communicate the DRM-encrypted video to secure DRM-enabled media player 153 of device 100, which in turn may display it on touch-screen 152. Video feedback, including touch-events of the user on touch-screen 152, may be exchanged between SP activity 159 of device 100 and a remote SOM 130 running in secure agent 198 of server 101.

SOM 130 may be implemented within secure agent 198 of server 101. In such implementation, SOM 130 need not comprise encryption module 143 and/or decryption module 144, as the encryption/decryption services may be provided by the HLOS of device 100. Server 101 may comprise, within its SOM 130 of secure agent 198, a TLS/SSL handshake support module 103, which may utilize using the client certificate or password of the user. Additionally, application support API 133 may similarly be implemented within server 101, instead of within device 100. In the server-based architecture, mobile device 100 need not necessarily include TLS/SSL support module 151 and/or augmented TLS/SSL library 131. Rather, instead of utilizing its own augmented TLS/SSL library 131, mobile device 100 may be assisted by TLS/SSL handshake support module 103 of server 101, which may provide services generally similar to augmented TLS/SSL library 131.

In system 200, the HLOS of device 100 may further comprise a server interaction module 104 for interacting with server 101. Server interaction module 104 may run in HLOS 120 (since device 100 may not comprise a usable SEE), and may utilize data and control-flow obfuscation to protect its logic and data. Server interaction module 104 may utilize a device internal key 105 that may be shared with server 101 to protect communications exchanged between server interaction module 104 of device 100, and remote server 101. Other keying schemes, such as Public Key Cryptography, may similarly be used. Device internal key 105 may be securely provisioned, or may be generated by device 100 in a pre-defined secure manner.

In system 200, SPEM 142 may be included in SOM 130 within secure agent 198 of server 101, and may operate by connecting (e.g., over a communication network) to a secure playback component 199 of device 100. Rewriter 132 may reside on server 101, instead of within device 100; and HLOS 120 of device 100 may utilize server interaction module 104 to interact with server 101 which may perform the required rewriting.

In system 200, encryption module 143 and decryption module 144 may be part of HLOS 120 of device 100, which may be implemented in a logic-obfuscated form and/or with data-obfuscation. These modules may communicate securely with a suitable module in server 101 which sends the encryption/decryption key, or data from which key material can be derived, to encryption module 143 and to decryption module 144 for them to operate.

Accordingly, server 101 may cause the authentication of the user (since SPEM 142 runs within secure agent 198 of server 101), and may then send the correct key to device 100, in a protected manner, such that encryption module 143 and/or decryption module 144 and/or encrypted partition manager 197 may utilize the key within device 100.

In system 200, key generation may be performed by key generator 145 on server 101, which may also handle secure storage. System 200 need not comprise and/or need not utilize any SEE on mobile device 100. For example, for secure password entry, a local HLOS application within device 100 may invoke a SPEM application 142 on server 101, which in turn may generate a DRM-encrypted video or image representing a scrambled PIN pad that is communicated to HLOS, which uses a secure playback component to render the video onto touch-screen 152, capturing keystrokes (as touch-event coordinates) and sending them back to server 101 for secure correlation with the scrambled keys represented in the scrambled PIN pad. In some embodiments, the PIN pad may not be scrambled, but rather, may be conveyed in a suitable method that prevents an entity or module, which is capable of capturing touch events, from determining the entered PIN or password.

Server 101 may receive from device 100 the Service Certificate (for validation by SP service certificate validator 183 within server 101), as well as other contextual data.

The present invention may include a process of website enrollment using secure password authentication. The process may allow a user of a mobile device to enroll a new website for secure authentication using the Secure Operations Module (SOM) of the present invention, when authentication is performed using a password (rather than by using a client certificate).

The user of the mobile device may navigate to a new website (for example, https://www.Bank.com) using a web browser application running on the mobile device. The browser may detect that the URL contains an "https" prefix, indicating a secure connection; and the browser may thus initialize TLS/SSL integration library 193 of secure TLS/SSL Support Module 151.

TLS/SSL integration library 193 may query its enrolled-sites database, and may detect that this particular website has not been enrolled yet. TLS/SSL integration library 193 may query its (non-persistent) cache of non-enrolled-websites; and may detect that this particular website is not listed. The non-enrolled-sites cache may prevent repeated enrollment tests for non-participating websites.

TLS/SSL integration library 193 may fetch the Service Certificate of the website, from a URL associated with the website (e.g., from http://www.Bank.com/SecureMobileCertificate), and may pass the certificate so to verify the validity of the fetched Service Certificate by TLS/SSL support library 131. For example, certificate signature may be checked against a reference public key that may be hard-coded in SEE 140 or in remote server 101, and only then, the format and the expiration may be verified. Alternatively, Online Certificate Status Protocol (OCSP) or other suitable protocols for obtaining revocation status may be used.

The user may be asked by website enrollment module 137 for the user's confirmation or permission to enroll the website; and the user may indicate his approval by tapping, clicking, selecting, or otherwise engaging with a suitable UI element displayed on device 100.

TLS/SSL support library 131 may add this website to the secure enrolled-websites database 138, and may enable the use of secure TLS for this website on this device 100. For example, for each service that is enrolled, there may be a record in secure storage 149 that contains data from the certificate (e.g., pinning information), and the user credentials that the user entered when enrolling (e.g., a client certificate or credentials to be used with rewriter 132). When the user enrolls for a website with a Service Certificate, these data items may be populated into that record within secure storage 149; and subsequently, when the user logs in again to a site or service with such data present, the data may be obtained from that record and may be used automatically.

The browser may fetch the website's log-in page, and may display it to the user on device 100. The user may enter his login details (e.g., the username and password that the user utilizes in order to access that website) on the login form, and may command the browser to submit the login details to the website.

If the Service Certificate so indicates, then the user may be requested or prompted to enter the login details on a secure UI supporting an alphanumeric keypad (e.g., an on-screen keypad or an on-screen keyboard). The user may securely enter his login details, in a manner that prevents interception of the login details by code running over the HLOS.

The browser may ask TLS/SSL support library 131 to save confidential credential information for this website, along with a User-ID selected by the user. The confidential credential information may be stored in secure storage 149 via SSM 141, and may comprise, for example, the form field(s) having a type of "password" (or, optionally, all the form fields of the login page of the website). The browser may save (e.g., insecurely) non-confidential fields in its local form-data history database. It is noted that the User-ID mentioned is not the "username" that the user may have associated with the website, but rather, the User-ID may be selected by the user from a list presented to the user (e.g., this option may be used if the mobile device is shared by multiple users).

TLS/SSL support library 131 may issue a Secure Password Entry request to SPEM 142, listing the site domain ("Bank.com") and certificate Common Name (CN) as well as a first-enrollment indication. In response to the enrollment request, the user may enter his password. Then, the confidential data may be permanently filed by SSM 141 in secure storage. It is noted that in some embodiments, firstly, the user may enters his "real" password (the password that the user defined to log-in for the website, not necessarily via mobile devices), to have it recorded within mobile device 100; whereas in the current step, the user may input a secondary password or a PIN (using a secure PIN entry interface) to acknowledge and initiate the login.

The browser may submit the form data to the website, over the TLS/SSL connection. The browser may switch the TLS connection to lower-confidentiality mode, resulting in a key renegotiation. The session may then continue without requiring additional operations from TLS/SSL support library 131 of TLS support module 151, as all TLS key-exchange operations may be performed in the SEE, while record payload protection may be performed in the HLOS library by TLS/SSL integration library 193. For example, an attack presenting certificate parameters that are different from the enrolled version, may result in an error.

It is noted that dis-enrollment may be implemented by using a UI which shows to the user a list of the services and/or websites for which he already enrolled, and which allows the user to select an item on that list and request removal or deletion, upon which, the appropriate record may be deleted from secure storage 149. In some embodiments, the user may modify his mobile PIN or password for a previously-enrolled website or service, through a dedicated UI component or process, or by dis-enrolling the website (or service) and then enrolling it again with a new password or PIN. It is further noted that if the user changes his password that is used for logging-in into the website (or service), not necessarily in connection with mobile devices, then automatic login through SOM 130 of device 100 may fail, and the user may need to dis-enroll and then re-enroll the website through his mobile device 100 in order to commit the new password into secure storage 149.

The present invention may further include a process of user login into a previously-enrolled website, by utilizing secure password authentication in accordance with the present invention.

The user of the mobile device may navigate to the previously-enrolled website (for example, https://www.Bank.com) using a web browser application running on the mobile device. The browser may detect that the URL contains an "https" prefix, indicating a secure connection; and the browser may thus initialize TLS/SSL integration library 193.

TLS/SSL integration library 193 may query its enrolled-sites database, and may detect that this particular website has already been enrolled. TLS/SSL integration library 193 may fetch the Service Certificate of the website, from a URL associated with the website (e.g., from http://www.Bank.com/SecureMobileCertificate), and may trigger the verification of the validity of the fetched Service Certificate. The Service Certificate may be fetched or obtained from any other location, or may otherwise be available to the device.

TLS/SSL integration library 193 may issue a Secure Password Entry request to SPEM 142, listing the site domain ("Bank.com") and certificate Common Name (CN). In response to the enrollment request, the user may enter his password.

TLS/SSL integration library 193 may enable high-security. In some embodiments, for example, the present invention may provide an augmented TLS implementation in the HLOS, which may know how to use assistive libraries for TLS that run in SEE 140, e.g., TLS/SSL support library 131. In a non-secure mode (or low confidentiality mode), the TLS library of the HLOS may operate similar to a conventional TLS library, except that the handshake may be performed by using the TLS/SSL support library 131 of SEE 140. In secure mode (or high confidentiality mode), the TLS library of the HLOS may utilize TLS/SSL support library 131 for encryption and decryption of the session traffic as well. A flag or other parameter, indicating the confidentiality mode, may be set or modified by the application (or browser) that utilizes TLS; and the Service Certificate may indicate (or may force) what the value should be, such that the application may not be able to change it. For example, the application may decide to request TLS to work in non-secure mode (low confidentiality mode), unless the Service Certificate dictates that this application should remain in secure mode (high confidentiality mode).

The browser may fetch the website's log-in page, and may display it to the user on device 100. Optionally, the browser may fetch default values of one or more non-confidential fields, e.g., from the browser's local form-data database.

The browser may insert mock values into the confidential fields, e.g., if such operation was indicated by data in the Service Certificate.

The user may command the browser to submit the login details to the website. The browser may send the login form to the website over the TLS/SSL connection. During the sending process, when the browser reaches a confidential field, instead of writing its own (mock) values, the browser may request TLS/SSL support library 131 to use the values already recorded in its secure storage database. It is noted that in some implementations, the browser may be a web-browser or other client-side application, modified or adapted to utilize he services of TLS/SSL support library 131.

Rewriter 132 may rewrite the submitted HTML page, such that it contains the true credentials from the database of TLS/SSL support library 131 instead of the mock values. TLS/SSL support library 131 may encrypt the submitted page, similar to the way it encrypts other records over TLS/SSL.

It is noted that the browser may communicate with TLS/SSL integration library 193 in the HLOS, which in turn utilizes services from TLS/SSL support library 131 in SEE 140. For example, TLS/SSL integration library 193 in the HLOS may request TLS/SSL support library 131 in SEE 140 to insert the credentials; and TLS/SSL support library 131 in SEE 140 performs the handshake with the remote server using data sent and received through TLS integration library 193. It is further noted that in high-confidentiality mode, TLS/SSL support library 131 in SEE 140 performs session encryption; whereas in low-confidentiality mode, TLS integration library 193 may perform session encryption.

The browser may switch the TLS connection to lower-confidentiality mode, resulting in a key renegotiation. The session may then continue without requiring additional operations from TLS/SSL support library 131 of TLS support module 151, as all TLS key-exchange (i.e., handshake) operations may be performed in the SEE, while record payload protection may be performed in the HLOS library. For example, an attack presenting certificate parameters that are different from the enrolled version, may result in an error.

The present invention may also include a process of enrollment of an application for using secure password authentication, in accordance with the present invention. The process may allow a user of a mobile device to enroll an application (or other application which may be accessible or run through a web browser) for secure authentication using the Secure Operations Module (SOM) of the present invention, when authentication is performed using a password (rather than by using a client certificate). It is noted that the term "application" may include, for example, a software application which may be at least partially installed locally (or may otherwise reside locally) on the mobile device, and/or may run at last partially on the mobile device, and/or which may require communication of the mobile device with a remote server, externally of a web browser.

The user of the mobile device may launch the application. The application may initialize TLS/SSL integration library 193, as well as TLS/SSL support library 131 of secure TLS/SSL Support Module 151; and may inform TLS/SSL support library 131 of its cloud server address (example, http://www.Bank.com). In some implementations, the local application may communicate with TLS integration library 193 of the HLOS, which in turn may check whether the service is enrolled (e.g., may check directly, or may request TLS/SSL support library 131 in SEE 140 to check).

For example, if the service is not enrolled, TLS integration library 193 of the HLOS may attempt to fetch the Service Certificate. Alternatively, TLS/SSL support library 131 may query its enrolled applications database, and may detect that this particular application has not been enrolled yet. TLS/SSL support library 131, through TLS/SSL integration library 193, may fetch the Service Certificate of the service, from a URL associated with the service (e.g., from http://www.Bank.com/SecureMobileCertificate), or from another suitable location or repository of Service Certificate(s), and may verify the validity of the fetched Service Certificate.

TLS/SSL support library 131 may add this application to the secure enrolled-applications database, and may enable the use of SEE-enabled TLS for this application on this device 100.

The application may obtain from the user his login details (e.g., username and password), through an on-screen UI presented by the application, or through a secure UI associated with TLS/SSL support library 131.

If the Service Certificate so indicates, then the user may be requested or prompted to enter the login details on a secure UI supporting an alphanumeric keypad (e.g., an on-screen keypad or an on-screen keyboard). The user may securely enter his login details, in a manner that prevents interception of the login details by code running over the HLOS.

The application may ask TLS/SSL support library 131 to save confidential credential information for this application, along with a User-ID selected by the user. The application may indicate to TLS/SSL support library 131 which field(s) or data-item(s) require secure storage (e.g., only the user password, or other data-items too); and the content of the required field(s) may be stored.

TLS/SSL support library 131 may issue, through TLS/SSL integration library 193, a Secure Password Entry request to SPEM 142, listing the name of the application (e.g., "Bank.com") and certificate Common Name (CN) as well as a first-enrollment indication. In response to the enrollment request, the user may enter his password. The application may submit a login request (e.g., using Simple Object Access Protocol (SOAP), using JavaScript Open Notation (JSON) standard, or the like) to the server of the application, over the TLS/SSL connection.

It would be appreciated that TLS/SSL integration library 193 may operate in order to cause secure modules of the system to perform one or more tasks. As a demonstrative example, augmented TLS/SSL library 131 may be a secure library within SEE 140, but augmented TLS/SSL library 131 may not operate unless or until it is triggered, for example, by TLS/SSL integration library 193 which may provide the input to augmented TLS/SSL library 131 and may receive the output from augmented TLS/SSL library 131. For example, two secure modules within SEE 140, may not directly communicate between themselves, but rather, may require the indirect operation of TLS/SSL integration library 193 which may facilitate the required process (e.g., verifying a certificate, such that TLS/SSL integration library 193 may open a network socket, obtain the certificate, and pass it as a parameter to augmented TLS/SSL library 131; or, when augmented TLS/SSL library 131 requires triggering of PIN entry by SPEM 142, augmented TLS/SSL library 131 may report such requirement as a response to TLS/SSL integration library 193, which in turn may trigger SPEM 142 to operate).

Optionally, the application may switch the TLS connection to lower-confidentiality mode, resulting in a key renegotiation. The session may then continue without requiring additional operations from TLS/SSL support library 131, as all TLS key-exchange operations may be performed in the SEE, while record payload protection may be performed by the HLOS library. For example, an attack presenting certificate parameters that are different from the enrolled version, may result in an error.

The present invention may additionally include a process of user invoking a previously-enrolled application, by utilizing secure password authentication in accordance with the present invention.

The user of the mobile device may launch the application. The application may initialize TLS/SSL integration library 193; and may inform TLS/SSL integration library 193 of its cloud server address (example, https://www.Bank.com).

TLS/SSL support library 131 may query its enrolled applications database, and may detect that this particular application has already been enrolled.

TLS/SSL support library 131 may, in combination with TLS/SSL integration library 193, fetch the Service Certificate of the application, from a URL associated with the application (e.g., from http://www.Bank.com/SecureMobileCertificate), and may verify the validity of the fetched Service Certificate.

TLS/SSL support library 131 may issue a Secure Password Entry request to SPEM 142, listing the name of the application (e.g., "Bank.com") and certificate Common Name (CN). In response to the enrollment request, the user may enter his password.

TLS/SSL support library 131 may enable high-security operation (e.g., SEE-enabled TLS).

The application may submit a login request (e.g., using Simple Object Access Protocol (SOAP), using JavaScript Open Notation (JSON) standard, or the like) to the server of the application, over the TLS/SSL connection. During the submission process, when the application reaches a confidential field (e.g., password field), the application may request TLS/SSL support library 131 to insert the credentials values that are securely stored locally in the application-database. Rewriter 132 may rewrite the submitted request, prior to sending it to the remote server, such that the submitted request includes (in the fields or places indicated by the application, or indicated in the Server Certificate) the true credentials values obtained from the local application-database. TLS/SSL support library 131 may encrypt the submitted request, similar to the way it encrypts other records over TLS/SSL.

The application may receive a response from the remote server over the TLS connection, and may save the session information (e.g., by utilizing a "cookie" or other mechanism).

Optionally, the application may switch the TLS connection to lower-confidentiality mode, resulting in a key renegotiation. The session may then continue without requiring additional operations from TLS/SSL support library 131, as all TLS key-exchange operations may be performed in the SEE, while record payload protection may be performed by the HLOS library. For example, an attack presenting certificate parameters that are different from the enrolled version, may result in an error.

Some embodiments of the present invention may optionally include, for example, general-purpose key secure storage. For example, SSM 141 which may be used for storing client certificates, passwords, and symmetric keys, may further be used for storage of general-purpose key material, e.g., as symmetric keys and/or asymmetric keys. Some embodiments of the present invention may optionally include, for example, key provisioning. This may allow, for example, secure over-the-air provisioning of key material directly from service providers to SSM 141. Some embodiments of the present invention may optionally include, for example, crypto-token capabilities. Such capabilities may allow performing authentication and digital signature computation operations using the above-mentioned key material. The above-mentioned features of some embodiments of the present invention may extend the functionality of the Secure Operations Module to a general-purpose remotely-provisioned crypto-module that may serve all authentication and authorization needs of a wide range of service providers, not necessarily using TLS/SSL connections.

In some implementations, enrollment may be performed over a website, which may then send the enrollment information to device 100, and may directly insert the data into the secure storage. Similar to a way in which a service provider may utilize a provisioning protocol to insert keys into a secure storage, the service provider may utilize a similar mechanism to store into the secure storage the values inserted to it by the user enrollment process described above. Accordingly, the user may not need to perform service enrollment, because enrollment may be performed without his action.

Figure 3:
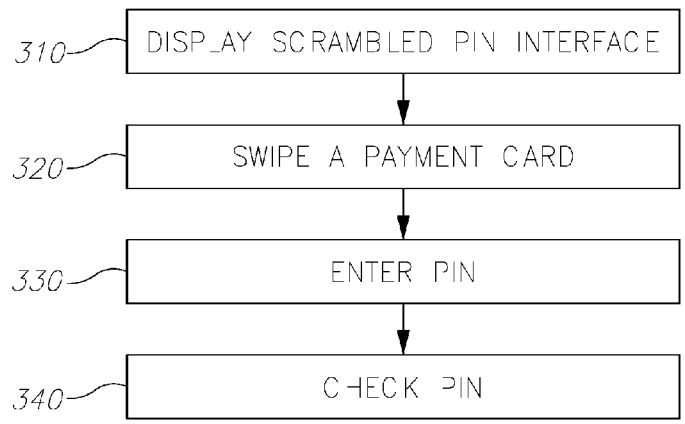
FIG. 3 is a schematic flow chart of a method of authenticating a user at a Point of Sale (PoS) terminal of a merchant, in accordance with some demonstrative embodiments of the present invention.

Reference is made to FIG. 3, which is a schematic flow-chart of a method of authenticating a user at a Point of Sale (PoS) terminal of a merchant or vendor, in accordance with the present invention. The PoS terminal may comprise, for example, a terminal having a touch-screen which may be operably associated with a payment card reader.

The PoS terminal may display on the touch-screen a scrambled PIN interface (block 310). The user may swipe a payment card through the card reader (or, may insert the payment card into the card reader) (block 320). The user may enter his PIN through the scrambled PIN interface (block 330). The entered PIN may be checked (block 340), for example, against the payment card or against a server of the payment card issuer (e.g., per the EMV standard or other suitable standard). The term "swipe" as used herein may comprise, for example, an action of sliding a payment card through a card reader; inserting a payment card into a card reader and/or removing a payment card from a card reader; creating contact between a payment card and a card reader; or otherwise performing an action which causes the card reader to read data (e.g., from a magnetic stripe or a chip) of the payment card.

In an alternate embodiment of the present invention, the user may swipe the payment card in a card reader as above; but then, the user may enter his PIN on his own mobile device (rather than on the merchant's terminal), and may utilize a scrambled PIN interface on his own mobile device for PIN entry; and the user's mobile device may then send the PIN, in an encrypted form, to the card issuer as above, may receive a response, and may send the confirmation code (e.g., encrypted) to the merchant's payment terminal. Other suitable operations or methods may be used.

In other embodiments of the present invention, the entered PIN may not be verified by the card issuer, but rather, by the payment card itself, for example, based on EMV card verification standards or methods. In such case, the PIN may be encrypted and may be passed to the payment card, which in turn may perform the check and may send back the verification response. In some embodiments of the present invention, mobile device 100 may not even be capable of "knowing" the correct PIN; rather, mobile device 100 may be trusted only with receiving the user's input, encrypting it, and transferring it for verification purposes to another module external to mobile device 100.

The Secure Password of the present invention may be implemented by utilizing a security model comprising assets such as, for example, a PIN, a password, a client certificate (Client-Cert), an application key (App-Key), Service Accreditation Data, and Internal Root-of-Trust (ROT). The security model may be used to implement a system aimed at securely authenticating a human user and his intent to perform an authentication action that involves one of his securely stored credentials, as well as to carry out this authentication action.

The PIN may allow a user with a given User-ID to authenticate himself and his intent to authenticate. The password may be one or more textual credential(s) used to authenticate a user of a given User-ID to a service provider with a given Provider-ID; the password asset may typically be a user-identifier and/or a user-designated password.

The Client-Cert may be a client X.509 certificate used to authenticate a user with a given User-ID to a server associated with a given Service-ID, over the TLS/SSL protocol (if supported by the service). App-Key may be a locally generated symmetric key for a user of a given User-ID and an application associated with a given Service-ID; used by the application to protect locally-stored data.

Service Accreditation Data may be a structure containing values that indicate the accreditation of a service provider to use a given Service-ID, properties of the server certificates used in TLS, and related parameters. Internal ROT may be an internal symmetric key stored in SEE 140, which may serve as the ROT for secure storage.

The present invention may require that the platform include a Secure Execution Environment (SEE). The SEE may be, for example, an environment provided by ARM TrustZone, possibly in conjunction with a Secure OS. Code running in the SEE may be protected against being modified (in run-time, as well as in storage); may be protected from having its control flow tampered with; and may be protected from having its runtime state (including data) revealed or altered by an attacker.

The present invention may require that the platform include a secure Root-of-Trust (ROT). For example, it may be required that a secret symmetric key of adequate entropy be available to the secure code of the Secure Password solution, in a way that it may not be revealed to (or modified by) another entity or another application, on the mobile device or outside the mobile device. The ROT key may be used to facilitate the secure storage that the Secure Password solution may utilize.

The present invention may further require that the mobile platform include a Secure Video Path, which may allow code running within the SEE to produce and transmit media content (images and/or videos) that may be rendered on the device screen, in full screen, without having the media exposed and/or tampered with by code running on the HLOS (e.g., another local application, or a malware module).

The present invention may be able to protect a mobile device, a communication system, and/or a user of a mobile device, from one or more suitable types of attackers or attacking entities, such as, for example: a permanent illegal possessor of the mobile device (e.g., a thief who stole the mobile device; a person who found a lost mobile device and does not return it to its legal owner); a transient illegal possessor who obtains temporary illegal custody of the mobile device (e.g., if the mobile device is left unattended for a few minutes); a generic malware module which may infest the mobile device (e.g., tailored to attack particular application(s), but not a particular user); a targeted malware module (e.g., tailored to attack a particular user); and/or other suitable types of attackers or attacks (e.g., a man-in-the-middle attacker, a "phishing" attack, a side-channel attack, or the like).

The present invention may be able to protect against various types of attacks, for example, offline attacks, runtime attacks, and/or API attacks. An offline attack may involve reading or altering values not through the execution environment of the device (e.g., not through the services provided by the mobile device, its CPU, or the like, for executing code), but rather using bypass means. An offline attack may include, for example, reading flash memory directly using a physically-connected controller when the device is powered off. A runtime attack may involve access to assets through the execution environment of the mobile device, yet outside the intended API of the Secure Password; for example, running a debugger to reveal contents of memory (RAM) or CPU registers; modifying the code that the execution environment performs, such as by replacing part of the code (applications and/or OS), re-flashing the device, or the like. API attacks may involve access to assets through the intended interfaces implemented by the Secure Password, but with an intent that differs from that assumed by the system design; some API attacks may be mounted without changing any of the code running on the mobile device.

The PIN asset may be protected against offline attacks. For example, the PIN may be protected against access that is not through the code running on the mobile device by the use of secure storage. SSM 141 may utilize an internal ROT key, which may be present and secured by the platform, to secure the data. The secure data may be protected against disclosure, as well as against illegal alteration. SSM 141 may run in SEE 140 facilitated by TrustZone. The secure storage may not store decrypted data other than in RAM, which may be accessible only by code running in SEE 140. Therefore, there may be no trace of decrypted secure storage data available when the device is powered off.

The PIN asset may be protected against runtime attacks. PIN values may only be available inside SEE 140, which protects its logic and intermediate data. PIN values may be entered into SEE 140 by utilizing SPEM 142; furthermore, PIN values may never be produced as output, other than in encrypted form. A PIN value may be first initialized by a human attacker (e.g., a "Permanent Illegal Possessor" attacker, or a "Transient Illegal Possessor" attacker) to a value of his choice, if a Control PIN is not used (e.g., an initial PIN that may be securely communicated to the legitimate owner of the mobile device, for example, on the packaging of the mobile device upon purchase, or in the paper documents provided with the mobile device upon purchase). The request for a correct PIN upon registration of new services may be intended to alert the user to such a situation, and to prevent other assets from being collected if the mobile device is in a state where the PIN set is not the one known to the user.

The PIN asset may be protected against API attacks. PIN values may be only accessible through APIs that set them, re-set them, check them against an entered value to provide a match or no-match response, or output in an encrypted form. Resetting a PIN may be performed only once the user is securely authenticated using the existing PIN; enforced by code running in SEE 140, such that it may not be not possible, through the publicly available interface, to reset the PIN without correctly entering the currently-set PIN. An initial PIN may be set by utilizing a Control PIN as described above. It is noted that PIN values may typically be susceptible to brute-force guessing attacks; however, in accordance with the present invention, PIN entry may only occur through SPEM 142 which utilizes the Secure Video Path. Accordingly, PIN guessing may only be performed manually, by a human interacting with mobile device 100 through its touch-screen unit. This may strictly restrict the ratio at which guessed PINs may be entered. Some implementations may further utilize a throttling function to restrict the number of PIN trials submitted per a time unit (e.g., per minute, per hour, per day).

The password asset may be protected against offline attacks. For example, textual credentials may be protected against offline attacks by being stored in the secure storage facilitated by SSM 141. The password asset may further be protected against runtime attacks. For example, textual credentials may only be available inside SEE 140, once they were entered. SEE 140 may protect the logic and intermediate data of any code that processes these credentials.

In some implementations, unless otherwise indicated by the Service Certificate, textual credentials that are entered by the user for the first time may be entered using the native device interface functions (e.g., an on-screen keyboard), where they might be captured by malware that may be positioned to capture such inputs. To mitigate this risk, the Service Certificate may indicate that such details (e.g., a textual or alphanumeric password) should be entered by using the more secure scattered (or scrambled) on-screen alphanumeric keyboard, in which characters appear in scattered or random places or appear to be out-of-order relative to a typical (QWERTY) keyboard.

The password asset may be protected against API attacks. For example, passwords and other user textual credentials may never be exported from the logic of the Secure Operations Module; they may only be entered into, and used within, the Secure Operations Module.

Usage of textual credentials may be supported only by incorporating them into an existing TLS/SSL session, through an operation that may not cause them to exit SEE 140 in plaintext form. There may thus be no perceived way of recovering the plaintext of those credentials from the encrypted TLS/SSL stream.

Textual credentials could theoretically be captured by causing the TLS handshake to be carried out using a server public key of which the private counterpart is known to the attacker. However, this attack may be blocked by the accreditation process that server keys go through; a credential may only be encrypted for a server which uses the same public key of the server with which the password was first enrolled, and which was approved to use the Secure Password service, thereby blocking "phishing" attacks against the user of the mobile device.

The Client-Cert asset, e.g., user private keys that are associated with TLS client certificates, may be protected against offline attacks. For example, user private keys may be stored in the secure storage facilitated by SSM 141. The Client-Cert asset may also be protected against runtime attacks, as user private keys may only be used in the TLS/SSL handshake process, which is performed by TLS/SSL support library 131 that runs in SEE 140. Therefore, client certificate data (e.g., the user's private key), may never be made available outside SEE 140, where it is protected.

The Client-Cert asset may be protected against API attacks, as user private keys may not be served by any API function published by the secure code. Services may only be provided for using loaded private keys for TLS/SSL handshake computations, which may not reveal information from which a private key can be deduced, guessed, or reverse-engineered.

Application Keys, e.g., application symmetric keys for secure local storage, may be protected against offline attacks, by being stored in the secure storage facilitated by SSM 141. Application Keys may further be protected against runtime attacks. For example, application keys may be used for encryption and decryption of application data, using encrypt and decrypt functions that may be implemented only within SEE 140 (this may not be applicable to a server-based implementation). Therefore, the application keys may never be available outside of SEE 140. Furthermore, in contrast with other security assets, the application keys may be locally generated within SEE 140, and thus they may not even be susceptible to interception during their initial provisioning.

Application keys may be protected against API attacks. The module of Secure Password that provides encryption and decryption services may be the only module having access to the application symmetric keys. Its only interface may be for encryption and decryption using application keys, and it may support no interface for input or output of application keys, neither in plaintext nor in encrypted form. The ciphers and modes that may be used with the application keys may be resistant to known and chosen plaintext attacks, making it unfeasible to deduce the application keys from the results that the interface may emit.

Service Accreditation Data, pertaining to accreditation of services and applications, may be protected against offline attacks, by being stored in the secure storage facilitated by SSM 141. Service Accreditation Data may further be protected against runtime attacks. For example, Service Accreditation Data may control the authorization of a service provider, associated with a Service-ID. The authorization may include association of the Service-ID with certain public keys that may be part of the Service-ID's TLS/SSL certificates, as well as information pertaining to its local applications, their identities, and their right to use local data encryption.

The Service Accreditation Data may contain, for example: (a) identity of the service, or indication that this identity is to be obtained from the TLS certificate; (b) information on the rights of the service to use the technology on the mobile device, for example, indication that local data encryption with a specific application key is to be supported; and (c) a specification resembling a query, or indications of condition(s), which may determine which TLS certificates of the server are allowed to be accepted. For example, the augmented TLS library may use the TLS certificate only if the TLS certificate was issued by a particular issuer, or only if the TLS certificate contains a particular public key, or other suitable condition(s).

Service accreditation data may be sensitive in terms of integrity and authenticity, but not in terms of confidentiality; and thus service accreditation data may only need to be protected against illegal alteration. The service accreditation data may mostly be stored outside of SEE 140, and some of the service accreditation data may be obtained or transferred over a network (e.g., as part of the Service Certificate). However, all consumers of the service accreditation data may be modules running within SEE 140, and these modules may verify the authenticity of the service accreditation data prior to using it, using a hard-coded public key. The public key for verification may be pinned to the implementation code of the Secure Operations Module, which may be protected via SEE 140. As a result, each element of the set of elements referred to as "service accreditation data" may be verified before it is used, by logic and reference key material which may be protected by SEE 140. No system components rely on the service accreditation data that are not running within SEE 140.

Service accreditation data may be protected against API attacks. Due to its non-secrecy, the only threat to service accreditation data may be illegal alteration. All service accreditation data may only be read by components of the Secure Password module; and therefore, no interface may be provided which supports alteration of the service accreditation data, neither legally (by the user) nor illegally (by an attacker).

The Internal ROT asset for secure storage may be protected against offline attacks, as a requirement from the platform of device 100. The Internal ROT may be protected against runtime attacks, as the Internal ROT may only be used by SSM 141, which itself may run only within SEE 140. The Internal ROT may thus never be exposed outside of SEE 140.

The Internal ROT may be protected against API attacks, as there may be no direct interface to Internal ROT key. The Internal ROT key may only be provided by the platform within SEE 140, and the Secure Password module may support no functionality of access to the Internal ROT key. The Internal ROT key may be only used internally within SEE 140 by SSM 141.

Figure 4:
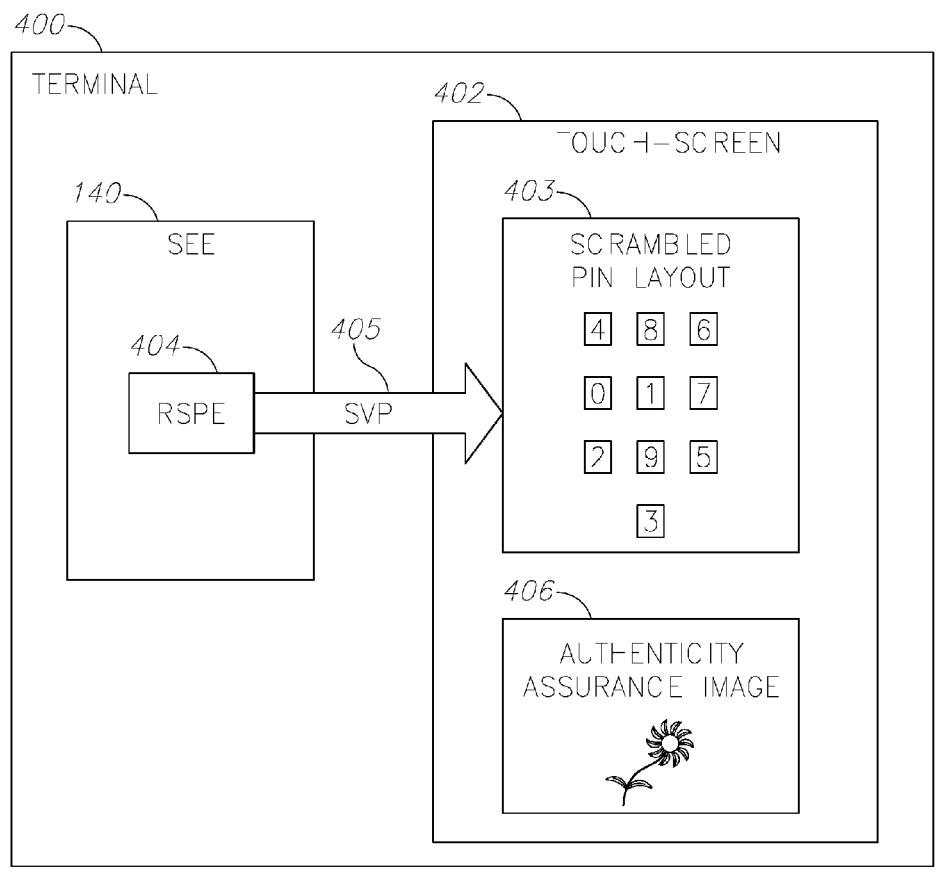
FIG. 4 is a schematic block diagram illustration of a terminal capable of secure PIN entry, in accordance with some demonstrative embodiments of the present invention.

Reference is made to FIG. 4, which is a schematic block diagram illustration of a terminal 400 capable of secure PIN entry, in accordance with the present invention. Terminal 400 may be generally similar to mobile device 100 of FIG. 1A, or may be other suitable device, for example, a mobile handset, a cellular phone, a smartphone, a PDA, a tablet, a device having a touch screen, a portable or handheld device, a laptop computer having a touch-screen, a desktop or tablet computer having a touch-screen, or the like. Terminal 400 may comprise, for example, SEE 140 and a touch-screen 402. SEE 140 may be able to securely execute code which may cause touch-screen 402 to render and display a scrambled PIN layout 403 representing (e.g., as an image, or a sequence of images, or a video) a scrambled on-screen keypad (or a scrambled virtual keypad); and touch-screen 402 may be able to receive user input, e.g., from a user who may touch, click, tap, or otherwise select key(s) from the scrambled on-screen keypad displayed as scrambled PIN layout 403 on touch-screen 402. SEE 140 may further be able to securely execute code which may cause touch-screen 402 to display a user-selected authenticity assurance image 406. For demonstrative purposes, and for purposes of clarity, authenticity assurance image 406 is depicted to be displayed on touch-screen 402 near or next to scrambled PIN layout 403. However, in some implementations, authenticity assurance image 406 may be displayed as a background image, a grayed-out or "washed" image, or an overlaid image or overlaid layer, below or above scrambled PIN layout 403, or as an image which partially or entirely overlaps with scrambled PIN layout.

For demonstrative purposes, scrambled PIN layout 403 is depicted as a keypad of 10 digits which are out of their numeric order and are not in a the order used in a conventional keypad. In some implementations, scrambled PIN layout 403 may be depicted using other suitable representations, for example, as four (or other number of) jack-pot wheels or slot-machine wheels, each wheel able to spin around its center and rotate among the digits "0" through "9", thereby representing a four-digit combination; with the initial combination being set to a random or pseudo-random value each time that scrambled PIN layout 403 is invoked. Other suitable types of representations or selection mechanisms may be used.

SEE 140 may comprise a Routine for Secure PIN Entry (RSPE) 404, which may be able to randomly or pseudo-randomly generate the PIN layout 403 displayed on touch-screen 402, and may be able to recognize the on-screen keys selected by the user via touch-screen 402.

Terminal 400 may allow secure data entry by a user, and particularly secure entry of a PIN or a password using the scrambled on-screen keypad (or a similar scrambled on-screen keyboard). Furthermore, terminal 400 may allow secure entry and secure communication of passwords and PINs by utilizing the scrambled virtual keypad (or scrambled virtual keyboard) in conjunction with a Secure Video Path (SVP) 405. Accordingly, the combination of SVP 405 with touch-screen 402 showing a scrambled on-screen keypad may allow secure PIN entry which may be more resistant to some types of attacks. It is noted that SVP 405 may be used for transporting both (or at least one of) the scrambled PIN layout and/or the authenticity assurance image.

SEE 140 may allow execution of code which, as part of its operation, requires the entry of a PIN by a user. The code that runs in SEE 140 may comprise RSPE 404, which may be protected from certain types of interference by being securely executed by SEE 140. RSPE 404 may generate scrambled PIN Layout 403, as an image or a video comprising at least icons representing characters that may be used for PIN entry (e.g., numeric digits, alphanumeric characters, characters or symbols that appear in a standard QWERTY keyboard, or the like).

PIN Layout 403 may include a scrambled or pseudo-random collection of images of keys, in a layout that differs from a standard QWERTY layout or a standard keypad layout. Scrambled PIN layout 403, or, a different Scrambled PIN layout 403, may be generated whenever a PIN is required to be entered by a user and processed by RSPE 404.

Optionally, RSPE 404 may comprise a module to generate authenticity assurance image 406, which may be presented to a user before the user enters the PIN. Authenticity assurance image 406 may comprise an image, a video or a text, and may be recognizable by the user (e.g., may match a pre-designated image previously defined by the user as an authenticity assurance image).

RSPE 404 may generate scrambled PIN layout 403 and/or authenticity assurance image 406 such that the image(s) comprise a representation of a value to be accepted by a user that enters the PIN. Prior to the entry of a PIN by the user, RSPE 404 may display to the user authenticity assurance image 406 over Secure Video Path 405. The user may deduce, from recognition of the representation in authenticity assurance image 406, the authenticity of the display, and in turn the user may deduce the authenticity of RSPE 404 (e.g., rather than suspecting that PIN layout 403 is presented by a "phishing" attacker or by a mock website).

RSPE may display the value to be accepted by the user along with authenticity assurance image 406.

According to some demonstrative embodiments of the present invention, RSPE 404 may cause touch-screen 402 to display scrambled PIN layout 403 and authenticity assurance image 406 simultaneously. RSPE 404 may display the value to be accepted by the user simultaneously with PIN Layout 403 and authenticity assurance image 406. Optionally, a user may be presented with an option of aborting the operation (e.g., the PIN entry process) at any point until a PIN is fully entered and/or submitted by the user.

The user may enter a PIN by selecting the suitable icons or keys which may be displayed, in a scrambled manner of in an out-of-order manner, on touch-screen 402, as such icons or on-screen keys are visible to the user from the display of scrambled PIN layout 403. The selection process causes touch events to be triggered on terminal 400, the touch events conveying positions that are touched by the user on touch-screen 402. The location(s) of touched positions as conveyed by the touch events may be provided by a suitable code running on terminal 400 to RSPE 404. Accordingly, RSPE 404 may use its locally-stored data describing scrambled PIN layout 403 to map the touched positions into the corresponding icons or keys that were selected, and may map them further to the matching symbols that were selected. RSPE 404 may output the sequence of selected symbols, in the order they were selected by the user via the scrambled on-screen keypad. An application running on terminal 400, and particularly an application running within SEE 140, may then perform operations (e.g., a login process; an authentication process) based on the PIN securely entered by the user.

Some embodiments of the present invention may include or may utilize other suitable architectures, or may utilize modules which may be located in other devices, for example, in a remote server and/or externally to the mobile device or the payment terminal. In a demonstrative implementation, for example, SEE 140 and RSPE 404 may reside on a remote server, rather than being included within terminal 400. Other suitable architectures may be used.

The present invention may further include a method and system for selecting and/or modifying an authenticity assurance image, which may also be referred to as a Personal Security Image (PSI). In some implementations, the user of the mobile device may select an image from the HLOS (e.g., from a local repository or "image gallery"), or may capture an image using a camera of the mobile device; and may then securely perform one or more image modification operations by utilizing a secure interface running securely within the SEE, thereby generating a truly unique PSI that only the user may recognize and that may not be intercepted or captured while it is being generated by the user. The image modification operations may include, for example, modification of color(s), brightness, darkness, contrast, saturation, hue, light level; color replacement (e.g., replace blue with green); image distortion; applying a filter to an image; or otherwise modifying or transforming the image from its original form, or otherwise modifying one or more visible properties of the image. In accordance with the present invention, the user may modify the PSI in a secure subsystem (the SEE) of the mobile device, even if the PSI was originally selected by the user (or captured by the user) over a GUI that is not necessarily secure.

In other implementations, the user may select the PSI from a pre-defined collection of images which may be available for selection at a remote website or server, and may then locally and securely modify the selected PSI, which may then be securely uploaded back to the remote website or server. This may allow the user to select a pre-defined PSI that was created by a third party, but to also introduce to such PSI a unique modification that only the user is aware of. A malware module which may run on the mobile device, and may possibly capture the selection of the PSI from the collection of pre-defined PSI items, may not be able to capture the image modification operation(s) that are performed by the user within the SEE, and may not be able to capture the modified image which may be transported securely from the SEE to the remote server.

Figure 5:
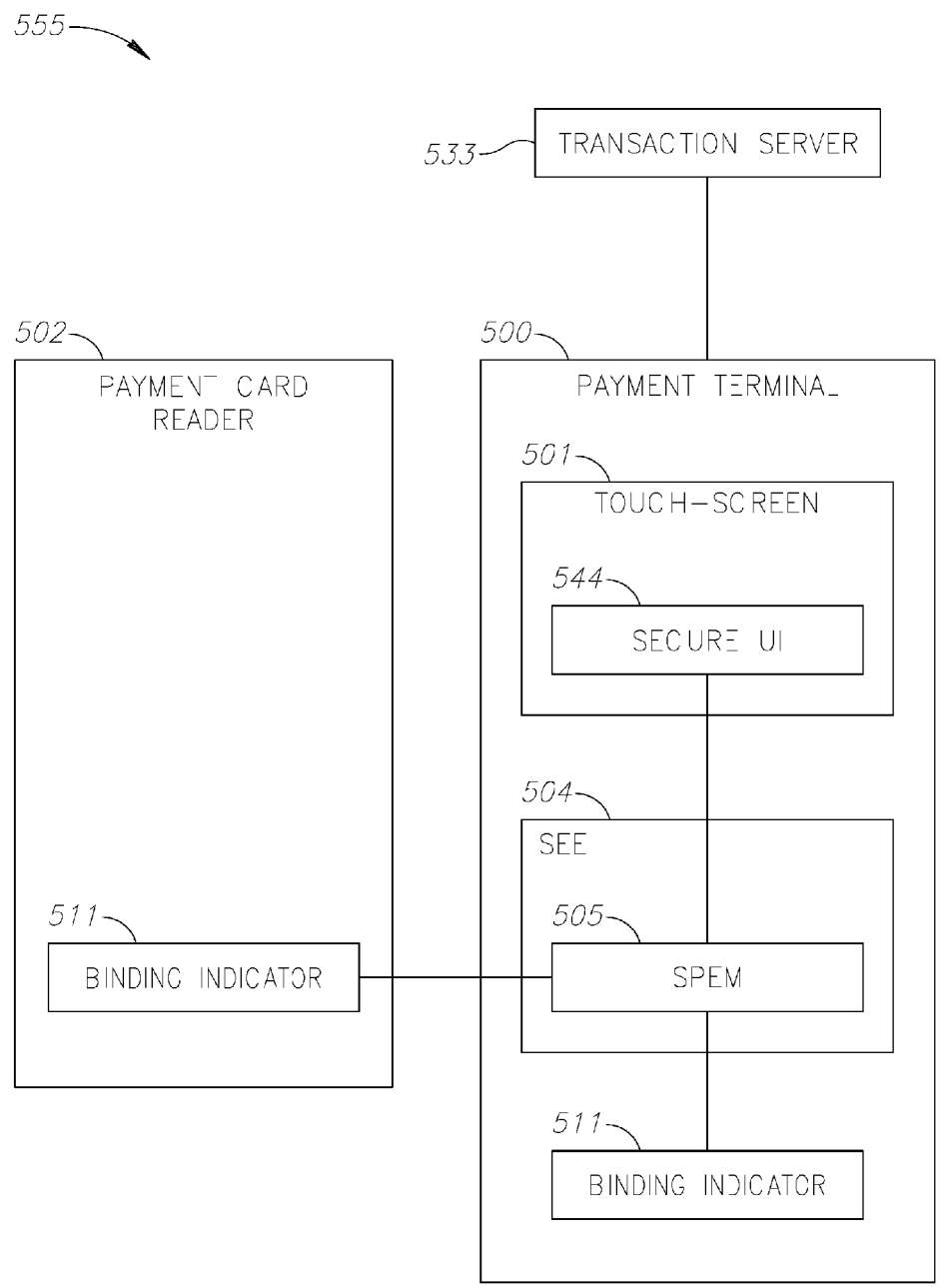
FIG. 5 is a schematic block diagram illustration of a system comprising a transaction server and a payment terminal, in accordance with some demonstrative embodiments of the present invention.

Reference is made to FIG. 5, which is a schematic block diagram illustration of a system 555 comprising a transaction server 533 and a payment terminal 500, in accordance with the present invention. System 555 may demonstrate secure interface binding, in accordance with the present invention, and may be used for payment to a merchant or vendor by a customer utilizing a payment card (e.g., credit card, debit card, magnetic stripe card, check-card, ATM card, Chip & PIN card, EMV card, or the like).

Payment terminal 500 may be or may comprise, for example, a mobile device, a mobile handset, a cellular phone, a smartphone, a PDA, a tablet, a laptop, a computer, an electronic consumer device, a device having a touch-screen, a portable or handheld device, a non-portable or stationary payment terminal, a Point of Sale (PoS) terminal, a payment terminal associated with a cash register or with a PoS terminal, or the like.

Payment terminal 500 may comprise, for example, a touch-screen 501; a payment card reader 502 able to read a payment card swiped through it or inserted into it; one or more binding indicator(s) 511; and a SEE 504 or other trusted execution environment which may comprise a Secure PIN Entry Module (SPEM) 505. For demonstrative purposed, payment card reader 502 is depicted to be connected to payment terminal 500; although payment card reader may be part of payment terminal 500, may be internal to or embedded with payment terminal 500, may be integrated with payment terminal 500, may be external to (and associated with) payment terminal 500, or may be a removable (or non-removable) add-on module to payment terminal 500. It is further noted that modules may be distributed across multiple devices; for example, in a server-based architecture, SEE 504 may be implemented on a remote server.

The present invention may allow secure PIN entry process on touch-screen 501 of payment terminal 500 which may provide a secure UI 544 protecting the PIN against capturing by an attacker. Secure UI 544 may comprise, for example, a scrambled PIN pad layout and/or an authentication assurance image. Secure UI 544 may be regarded as "activated" or "operational" when payment terminal 500 provides protection of either (a) output data displayed on touch-screen 501, or (b) input data entered manually by a user onto touch-screen 501 (via a touch, gesture, click, finger movement, finger swipe, finger selection, or the like). Additionally or alternatively, secure UI 544 may be regarded as "activated" or "operational" if, and only if, secure UI 544 is able to (a) securely receive data from SEE 504 for display through touch-screen 501, or (b) securely transfer data from touch-screen 501 into SEE 504. Additionally or alternatively, secure UI 544 may be regarded as "activated" or "operational" if, and only if, a bi-directional secure communication path is established between logic or code running on SEE 504 and logic or code running on payment card reader 502, such that the secure path is protected against compromise of its contents integrity and/or confidentiality by any unauthorized logic or entity within payment terminal 500 and/or externally to payment terminal 500.

Binding indicator 511 may comprise, for example, a Light Emitting Diode (LED) or other illumination unit, able to illuminate in a particular color (e.g., green or yellow). Binding indicators may be located on payment card reader 502, or on other components of System 555. Optionally, two or more binding indicators 511 may be incorporated in payment system 555, for example, a binding indicator 511 on payment card reader 502 and another binding indicator on or near touch-screen 501.

In accordance with some embodiments of the present invention, binding indicator 511 may illuminate only when secure UI 544 is activated or operational; and binding indicator 511 may not illuminate when secure UI 544 is not activated or is non-operational.

In accordance with some embodiments of the present invention, binding indicator 511 may illuminate in a first color (e.g., green) when secure UI 544 is activated or operational; and binding indicator 511 may illuminate in a second color (e.g., red) when secure UI 544 is not activated or is non-operational.

Once secure UI 544 is activated, SPEM 505 may send a signal or a command which causes binding indicator 511 to illuminate (or, to illuminate in the first color). Once secure UI 544 is non-activated, SPEM 505 may send a signal or a command which causes binding indicator 511 to turn off and not illuminate (or, to illuminate in the second color).

It is noted that the mode of binding indicator 511 (e.g., illuminating or non-illuminating; or, illuminating in a first color or illuminating in a second color) may be controlled by (or triggered by, or modified by) a module or component external to payment card reader 502, and/or by SPEM 505, and/or by other module or logic running within SEE 504.

Binding indicator 511 may be or may comprise, for example, a LED, an Organic LED (OLED), an illumination unit, a visual signal, an audible signal or sound or audio-clip, a video clip or animated clip, a graphical or textual item, or other suitable indicator or signal indicating to the user that secure UI 544 is activated and that, therefore, it may now be safe for the user to enter his PIN (or password) on touch-screen 501 of payment terminal 500.

Upon entry of the PIN, payment terminal 500 may communicate securely over wired and/or wireless link(s) with transaction server 533 to verify the entered PIN, or to provide transaction details. In some embodiments, optionally, the entered PIN may be tested or verified on the payment card within payment card reader 502, rather than at transaction server 533.

SPEM 505 or other suitable logic within payment terminal 500 may further operate to prevent other logic from modifying and/or capturing any of the data displayed on touch-screen 501, for as long as secure UI 544 is activated.

While secure UI 544 is activated, SPEM 505 may cause payment card reader 502 to operate or to fully operate, and to read a payment card. In contrast, while secure UI 544 is not activated, SPEM 505 may cause payment card reader 502 to not operate, or to avoid reading a payment card swiped through it or inserted into it.

While secure UI 544 is activated, SPEM 505 may cause payment terminal 500 to run one or more functions on data subsequently arriving from payment card reader 502.

Once secure UI 544 is no longer activated, and/or once touch-screen 501 no longer displays a secure interface (e.g., a scrambled PIN pad), SPEM 505 may cause payment card reader 502 to cease operation, e.g., to disable the capability of payment card reader 502 to read a payment card.

Once secure UI 544 is no longer activated, and/or once touch-screen 501 no longer displays a secure interface (e.g., a scrambled PIN pad), SPEM 505 may cause payment terminal 500 to stop running one or more functions on data subsequently arriving from payment card reader 502.

SPEM 505 may cause a secure data connection to be established between payment terminal 500 and transaction server 533, e.g., before secure UI 544 is activated. The secure data connection, if established, may transfer data from transaction server 533 to SPEM 505, and the data may allow SPEM 505 to render on touch-screen 501 an authenticity assurance image (e.g., a user-recognizable image that was pre-designated by the user).

In some embodiments of the present invention, the secure data connection between payment terminal 500 and transaction server 533 may be used to convey Accreditation Data or an Accreditation Certificate from transaction server 533 to payment terminal 500.

SPEM 505 may implement logic that controls the functionality of SPEM 505 in accordance with information contained in the Accreditation Certificate. For example, the Accreditation Certificate may contain information that, when processed by SPEM 505, may cause SPEM 505 to refrain from performing at least a part of the PIN pad functionality if, for example, data conveyed over the connection between payment terminal 500 and payment card reader 502 indicates a particular identity (or particular type) of payment card reader 502.

It would be appreciated that system payment terminal 500 is not merely a computerized system in which a LED indicator signals that a "secure mode" is operational, or that payment card reader 502 is ready for swiping a payment card through it. Rather, payment terminal 500 demonstrates LED indicator or other suitable indicator, located on a secure (e.g., closed) appliance (e.g., payment card reader 502) indicating to an unwary user whenever a usually-untrusted open device can be temporarily trusted due to the temporal takeover of its secure part over its insecure part. The LED indicator may not merely indicate readiness for swiping the payment card, but rather, that this normally-insecure device is temporarily secure enough for the user to enter his PIN or password thereon. The LED indicator may indicate the takeover of a secure subsystem of the UI of a general-purpose device, at least in the context of PIN entry or password entry. It is noted that the LED indicator may truly indicate secure binding between payment card reader 502 and payment terminal 500; such that even if the HLOS of payment terminal 500 is compromised, the attacker may not be able cause the LED indicator to illuminate.

The term "cryptographic operation" as used herein may include, for example, encoding, decoding, signing, authenticating, hashing, and/or performing other suitable operations related to cryptography and/or data security. For example, a "cryptographic operations module" or a "crypto-token module" may include an encoding module and/or a decoding module and/or other suitable modules or units.

Some embodiments of the present invention may be implemented by using a suitable combination of hardware components and/or software modules, which may include, for example: a processor, a central processing unit (CPU), a digital signal processor (DSP), a single-core or multiple-core processor, a processing core, an Integrated Circuit (IC), a logic unit, a controller, buffers, accumulators, registers, memory units, storage units, input units (e.g., keyboard, keypad, touch-screen, stylus, physical buttons, microphone, on-screen interface), output units (e.g., screen, touch-screen, display unit, speakers, earphones), wired and/or wireless transceivers, wired and/or wireless communication links or networks (e.g., in accordance with IEEE 802.11 and/or IEEE 802.16 and/or other communication standards or protocols), network elements (e.g., network interface card (NIC), network adapter, modem, router, hub, switch), power source, Operating System (OS), drivers, applications, and/or other suitable components.

Some embodiments of the present invention may be implemented as an article or storage article (e.g., CD or DVD or "cloud"-based remote storage), which may store code or instructions or programs that, when executed by a computer or computing device or other machine, cause such machine to perform a method in accordance with the present invention.

Some embodiments of the present invention may be implemented by using a software application or "app" which may be downloaded or purchased or obtained from a website or from an application store (or "app store" or an online marketplace).

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A computing device comprising:
   a secure storage unit to securely store a confidential data item;
   a non-secure execution environment to execute program code, the program code to generate in the non-secure execution environment a first version of a message intended for transport to a remote server;
   a secure execution environment (SEE) in the computing device, to securely execute code, the SEE comprising:
   a rewriter module operable in the SEE and internally to the computing device,
   (a) to securely obtain the confidential data item from the secure storage unit of the computing device, and
   (b) to securely generate a second version of the message by securely writing by the rewriter module that is operable in the SEE, the confidential data item, that was securely obtained from the secure storage unit in a non-encrypted form, into one or more fields in the first version of the message that was generated in the non-secure execution environment,
   wherein the second version of the message is different from the first version of the message due to one or more bit-replacement operations that the rewriter module performed within the SEE on the first version of the message,
   wherein the first version of the message is accessible by both the SEE and the non-secure execution environment,
   wherein the second version of the message is accessible by the SEE but is non-accessible by the non-secure execution environment,
   wherein the non-secure execution environment is not configured to determine whether or not the rewriter module of the SEE performed bit-replacement operations on the first version of the message when securely creating the second version of the message from the first version of the message;
   (c) to securely encrypt the second version of the message in the SEE of the computing device for encrypted transport of the second version of the message from the computing device to the remote server.

2. The computing device of claim 1, wherein the confidential data item comprises at least one of: a password, a Personal Identification Number (PIN), a username, a string representing user credentials, a data item for authentication;
wherein the SEE comprises code to securely perform an encryption operation on the second version of the message prior to its transport to the remote server.

3. The computing device of claim 1, wherein the program code comprises an application to transport the encrypted second version of the message to the remote server via a transport security protocol.

4. The computing device of claim 1, wherein the non-secure execution environment is to create a data object indicating a particular field of the first version of the message which contains a password entered by a user as plain-text;
wherein the rewriter module of the SEE is to determine, within the SEE, to perform bit-replacement operations in the particular field of the first version of the message to replace (A) a plain-text representation of the password with (B) an encrypted representation of the password that is generated internally within the SEE and is unknown to the non-secure execution environment.

5. The computing device of claim 1, wherein the computing device is to autonomously fetch a service certificate stored remotely at a pre-defined URL associated with the remote server;
wherein the SEE of the computing device is to verify the validity of the service certificate of the remote server;
wherein the rewriter module of the SEE comprises: a field determining module to determine a particular field of the first version of the message, in which the confidential data item is to be rewritten by the rewriter module, based on content of the service certificate that was fetched by the computing device from the remote server.

6. The computing device of claim 1, wherein the program code comprises a web browser, and wherein rewriter module of the SEE is to rewrite a portion of the first version of the message which comprises data representing a plaintext password intended by the non-secured execution environment to be transferred to the remote server over HyperText Transfer Protocol Secure (HTTPS); wherein the SEE comprises a Transport Layer Security/Secure Sockets Layer (TLS/SSL) support library which, instead of obliviously encrypting the first version of the message for encrypted transport to the remote server, performs selective and non-oblivious rewriting of bits within the first version of the message to generate the second version of the message which is then encrypted for encrypted transport to the remote server.

7. The computing device of claim 1, wherein the first version of the message comprises at least: a username field and a password field that were entered as plain-text by a user of the computing device, and one or more other form-fields that were entered as plain-text by the user of the computing device;
wherein the SEE is to selectively determine (A) that the username field and the password field contain plain-text data that needs to be securely replaced by the rewriter module of the SEE with replacement data prior to secure encryption of the message by the SEE, and (B) that the one or more other form-fields of the first version of the message, that were entered as plain-text by the user of the computing device, need not be securely replaced by the rewriter module of the SEE prior to secure encryption of the message by the SEE.

8. The computing device of claim 1, wherein the first version of the message comprises one or more authentication-related data items for authenticating a user to the remote server.

9. The computing device of claim 1, wherein the rewriter module is capable of operating independently of a particular type of authentication scheme utilized by the remote server, wherein operations of the rewriter module keep the remote server unaware that rewriting is selectively performed on portions of the first version of the message within the SEE of the computing device.

10. The computing device of claim 1, wherein the computing device comprises a device selected from the group consisting of: a payment terminal, a portable device, an electronic device having a touch-screen, a smartphone, and a tablet.

11. The computing device of claim 1, wherein the SEE further comprises:
a Personal Security Image (PSI) generation module, which
(A) receives a user selection of a particular PSI;
(B) securely performs within the SEE of the computing device, to the particular PSI that was selected by the user, a user-specific unique modification that was instructed by the user of the computing device;
(C) securely uploads from the SEE of the computing device to the remote server, a modified version of the PSI, that reflects the user-specific unique modification that was instructed by the user of the computing device;
wherein even if an attacker or a malware module intercepts the selection of the PSI that was performed by the user by utilizing the non-secure execution environment of the computing device, the attacker or malware module cannot obtain the modified version of the PSI that was securely modified within the SEE and was securely uploaded from the SEE to the remote server.

12. The computing device of claim 1, wherein the first version of the message comprises one or more authentication-related data items for authenticating a user to the remote server;
wherein the SEE comprises a Transport Layer Security/Secure Sockets Layer (TLS/SSL) support library, which comprises:
(A) a website/application enrollment module to determine whether or not a website or an application, that are being accessed by the computing device, are already enrolled for secure password authentication;
(B) a locally-stored enrollment database, stored locally and securely within the SEE of the computing device, to store previously-enrolled websites and applications that had been previously enrolled for secure password authentication by the computing device.

13. The computing device of claim 12, wherein the TLS/SSL support library further comprises:
(C) a non-persistent-cache of non-enrolled websites and non-enrolled applications, to prevent repeated enrollment tests for non-enrolled websites or non-enrolled applications.

14. The computing device of claim 13, wherein the website/application enrollment module, upon obtaining a one-time user permission to enroll a new website or a new application, is: (I) to add the new website or the new application, to the locally-stored enrollment database; (II) to enable the utilization of the TLS/SSL support library and the rewriter module of the SEE with regard to subsequent messages that are intended to be sent from the non-secure execution environment of the computing device to the new website or the new application; (III) to store in the locally-stored enrollment database, for the new website or the new application, an enrollment record.

15. The computing device of claim 14, wherein the enrollment record comprises:
   (a) pinning information obtained from a service certificate that was fetched by the computing device from a pre-defined location of the remote server; and
   (b) authentication credentials of the user of the computing device in a form ready for subsequent utilization by the rewriter module of the SEE in subsequent rewriting of messages intended to be transported to the remote server that is associated with the enrolled new website or with the enrolled new application.

16. The computing device of claim 1, wherein the non-secure execution environment is not configured to determine autonomously whether the encrypted second version of the message, which is transported from the computing device to the remote server, (A) is identical to the first version of the message or (B) is different from the first version of the message.

17. A method implementable on a computing device, the method comprising:
   securely storing a confidential data item in a secure storage unit of the computing device;
   executing a program code in a non-secure execution environment of the computing device, wherein the program code comprises program code to generate in the non-secure execution environment a first version of a message intended for transport to a remote server;
   securely executing code in a secure execution environment (SEE) of the computing device, wherein the SEE is in the computing device;
   wherein securely executing the code in the SEE comprises performing these operations by a rewriter module operable in the SEE and internally to the computing device:
   (a) securely obtaining the confidential data item from the secure storage unit of the computing device, and
   (b) securely generating a second version of the message by securely writing by the rewriter module that is operable in the SEE, the confidential data item, that was securely obtained from the secure storage unit in a non-encrypted form, into one or more fields in the first version of the message that was generated in the non-secure execution environment,
   wherein the second version of the message is different from the first version of the message due to one or more bit-replacement operations that the rewriter module performed within the SEE on the first version of the message,
   wherein the first version of the message is accessible by both the SEE and the non-secure execution environment,
   wherein the second version of the message is accessible by the SEE but is non-accessible by the non-secure execution environment,
   wherein the non-secure execution environment is not configured to determine whether or not the rewriter module of the SEE performed bit-replacement operations on the first version of the message when securely creating the second version of the message from the first version of the message;
   (c) securely encrypting the second version of the message in the SEE of the computing device for encrypted transport of the second version of the message from the computing device to the remote server,
   wherein the non-secure execution environment is not configured to determine autonomously whether the encrypted second version of the message, which is transported from the computing device to the remote server, (A) is identical to the first version of the message or (B) is different from the first version of the message.

* * * * *